(12) United States Patent
Onggosanusi et al.

(10) Patent No.: US 9,973,249 B2
(45) Date of Patent: May 15, 2018

(54) CHANNEL STATE INFORMATION FEEDBACK SCHEMES FOR FD-MIMO

(71) Applicant: Samsung Electronics Co., Ltd, Suwon-si (KR)

(72) Inventors: Eko Onggosanusi, Mountain View, CA (US); Boon Loong Ng, Mountain View, CA (US); Thomas Novlan, Mountain View, CA (US); Young-Han Nam, Mountain View, CA (US)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 180 days.

(21) Appl. No.: 14/975,182

(22) Filed: Dec. 18, 2015

(65) Prior Publication Data

US 2016/0182137 A1    Jun. 23, 2016

Related U.S. Application Data

(60) Provisional application No. 62/206,021, filed on Aug. 17, 2015, provisional application No. 62/201,375, filed on Aug. 5, 2015, provisional application No. 62/184,281, filed on Jun. 25, 2015, provisional application No. 62/096,253, filed on Dec. 23, 2014.

(51) Int. Cl.
*H04B 7/04* (2017.01)
*H04B 7/06* (2006.01)

(52) U.S. Cl.
CPC ......... *H04B 7/0478* (2013.01); *H04B 7/0469* (2013.01); *H04B 7/0632* (2013.01); *H04B 7/0639* (2013.01)

(58) Field of Classification Search
CPC .. H04B 7/0478; H04B 7/0469; H04B 7/0639; H04B 7/0632
See application file for complete search history.

(56) References Cited

U.S. PATENT DOCUMENTS

| | | | |
|---|---|---|---|
| 2009/0059844 A1* | 3/2009 | Ko | H04B 7/0413 370/328 |
| 2010/0157924 A1* | 6/2010 | Prasad | H04W 52/346 370/329 |
| 2012/0076023 A1 | 3/2012 | Ko et al. | |

(Continued)

FOREIGN PATENT DOCUMENTS

WO    WO 2013/144361 A1    10/2013

OTHER PUBLICATIONS

"Remaining Details of Further Downlink MIMO Enhancements for LTE-Advanced", NSN, Nokia, 3GPP TSG-RAN WG1 Meeting #74, Aug. 19-23, 2013, 6 pages, R1-133471.

(Continued)

*Primary Examiner* — Christine Ng

(57) ABSTRACT

A method of operating a user equipment (UE). The method includes receiving a configuration message comprising a reporting type of channel state information (CSI). The method further includes calculating, in response to the configuration message, a CSI report comprising at least one precoding matrix indicator (PMI) associated with a codebook including a plurality of vectors, wherein each vector in the codebook represents a selection of a pair of antenna ports and a co-phasing between two antenna ports of the pair. The method further includes transmitting the CSI report on an uplink channel.

17 Claims, 10 Drawing Sheets

(56) References Cited

U.S. PATENT DOCUMENTS

| | | | |
|---|---|---|---|
| 2013/0294487 A1* | 11/2013 | Kim | H04L 1/0009 375/219 |
| 2013/0308715 A1* | 11/2013 | Nam | H04B 7/0469 375/267 |
| 2014/0078919 A1 | 3/2014 | Hammarwall | |
| 2014/0098689 A1* | 4/2014 | Lee | H04B 7/0469 370/252 |
| 2014/0112173 A1 | 4/2014 | Hammarwall et al. | |

OTHER PUBLICATIONS

"Remaining aspects of Rel-12 DL-MIMO enhancements", Motorola Mobility, 3GPP TSG RAN WG1 Meeting #74, Aug. 19-23, 2013, 3 pages, R1-133548.

"Performance of downlink MIMO enhancements", Renesas Mobile Europe Ltd., 3GPP TSG-RAN WG1 Meeting #72, Jan. 28-Feb. 1, 2013, 6 pages, R1-130416.

Written Opinion of the International Searching Authority dated Apr. 20, 2016 in connection with International Patent Application No. PCT/KR2015/014182.

International Search Report dated Apr. 20, 2016 in connection with International Patent Application No. PCT/KR2015/014182.

3rd Generation Partnership Project; Technical Specification Group Radio Access Network; Evolved Universal Terrestrial Radio Access (E-UTRA;); Multiplexing and channel coding (Release 12); 3GPP TS 36.212 V12.3.0; Dec. 2014—89 pages.

3rd Generation Partnership Project; Technical Specification Group Radio Access Network; Evolved Universal Terrestrial Radio Access (E-UTRA); Physical layer procedures; 3GPP TS 36.213 V12.4.0; Dec. 2014—225 Pages.

3rd Generation Partnership Project; Technical Specification Group Radio Access Network; Evolved Universal Terrestrial Radio Access (E-UTRA); Physical channels and modulation (Release 12);3GPP TS 36.211 V12.4.0 Dec. 2014—124 Pages.

"3rd Generation Partnership Project; Technical Specification Group Radio Access Network; Evolved Universal Terrestrial Radio Access (E-UTRA); Physical Channels and Modulation (Release 11)"; 3GPP TS 36.211 v11.6.0; Sep. 2014; 120 pages.

"3rd Generation Partnership Project; Technical Specification Group Radio Access Network; Evolved Universal Terrestrial Radio Access (E-UTRA); Radio Resource Control (RRC); Protocol Specification (Release 12)"; 3GPP TS 36.331 V12.4.0; Dec. 2014; 410 pages.

Alcatel-Lucent et al; "Way Forward on 8Tx Codebook for Rel. 10 DL MIMO"; 3GPP TSG RAN WG1 62; R1-105011; Madrid, Spain; Aug. 23-27, 2010; 6 pages.

Etri; "Potential CSI-RS and CSI feedback enhancements for EBF/ FD-MIMO"; 3GPP TSG RAN WG1 Meeting #79; R1-144923; San Francisco, USA; Nov. 17-21, 2014; 6 pages.

Texas Instruments; "Possible Refinement on 8Tx Codebook Design"; 3GPP TSG RAN WG1 60bis; R1-102104; Beijing, China; Apr. 12-16, 2010; 7 pages.

Foreign Communication from Related Counterpart Application; European Patent Application No. 15873647.0; Extended European Search Report and European Search Opinion dated Jan. 2, 2018; 12 pages.

* cited by examiner

CHANNEL STATE INFORMATION FEEDBACK SCHEMES FOR FD-MIMO

CROSS-REFERENCE TO RELATED APPLICATION(S) AND CLAIM OF PRIORITY

This application claims priority under 35 U.S.C. § 119(e) to U.S. Provisional Patent Application No. 62/206,021 filed on Aug. 17, 2015 entitled CHANNEL STATE INFORMATION (CSI) FEEDBACK SCHEMES FOR FD-MIMO and U.S. Provisional Patent Application No. 62/201,375 filed on Aug. 5, 2015 entitled CHANNEL STATE INFORMATION (CSI) FEEDBACK SCHEMES FOR FD-MIMO and U.S. Provisional Patent Application No. 62/184,281 filed on Jun. 25, 2015 entitled CHANNEL STATE INFORMATION (CSI) FEEDBACK SCHEMES FOR FD-MIMO and U.S. Provisional Patent Application No. 62/096,253 filed on Dec. 23, 2014 entitled CHANNEL STATE INFORMATION (CSI) FEEDBACK SCHEMES FOR FD-MIMO. The above-identified provisional patent application is hereby incorporated by reference in its entirety.

TECHNICAL FIELD

This disclosure relates generally to full-dimension multiple-input multiple-output (FD-MIMO) wireless communication systems. More specifically, this disclosure relates to a channel state information (CSI) feedback scheme for FD-MIMO.

BACKGROUND

Given the spatial multiplexing provided by a full dimensional multiple-input multiple-output (FD-MIMO) system, understanding and correctly estimating the channel between a user equipment (UE) and an eNodeB (eNB) is important for efficient and effective wireless communication. In order to correctly estimate channel conditions, the UE may provide feedback information about channel measurement (such as channel state information (CSI)) to the eNB. With this information about the channel measurement, the eNB is able to select appropriate communication parameters to efficiently and effectively perform wireless data communication with the UE. Accordingly, an efficient CSI feedback scheme that may provide scalability (such as a number and geometry of transmit antennas) and flexibility of feedback information is needed to enhance a wireless communication system when an FD-MIMO system including a large two-dimensional antenna arrays is supported.

SUMMARY

This disclosure provides CSI feedback schemes for FD-MIMO.

In one embodiment, a UE is provided. The UE includes at least one receiver configured to receive a configuration message comprising a reporting type of CSI. The UE further includes a controller configured to calculate, in response to the configuration message, a CSI report comprising at least one PMI associated with a codebook t including a plurality of vectors, wherein at least one vector in the codebook represents a selection of a pair of antenna ports and a co-phasing between two antenna ports of the pair. The UE further includes at least one transmitter configured to transmit the CSI report on an uplink channel.

In another embodiment, an eNB is provided. The eNB includes a controller configured to generate a configuration message comprising a reporting type of CSI. The eNB further includes at least one transmitter configured to transmit the configuration message. The eNB further includes at least one receiver configured to receive a CSI report on an uplink channel, the CSI report including at least one PMI associated with a codebook including a plurality of vectors, wherein at least one vector in the codebook represents a selection of a pair of antenna ports and a co-phasing between two antenna ports of the pair.

In another embodiment, a method of operating a UE is provided. The method includes receiving a configuration message comprising a reporting type of CSI. The method further includes calculate, in response to the configuration message, a CSI report comprising at least one PMI associated with a codebook including a plurality of vectors, wherein at least one vector in the codebook represents a selection of a pair of antenna ports and a co-phasing between two antenna ports of the pair. The method further includes transmitting the CSI report on an uplink channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
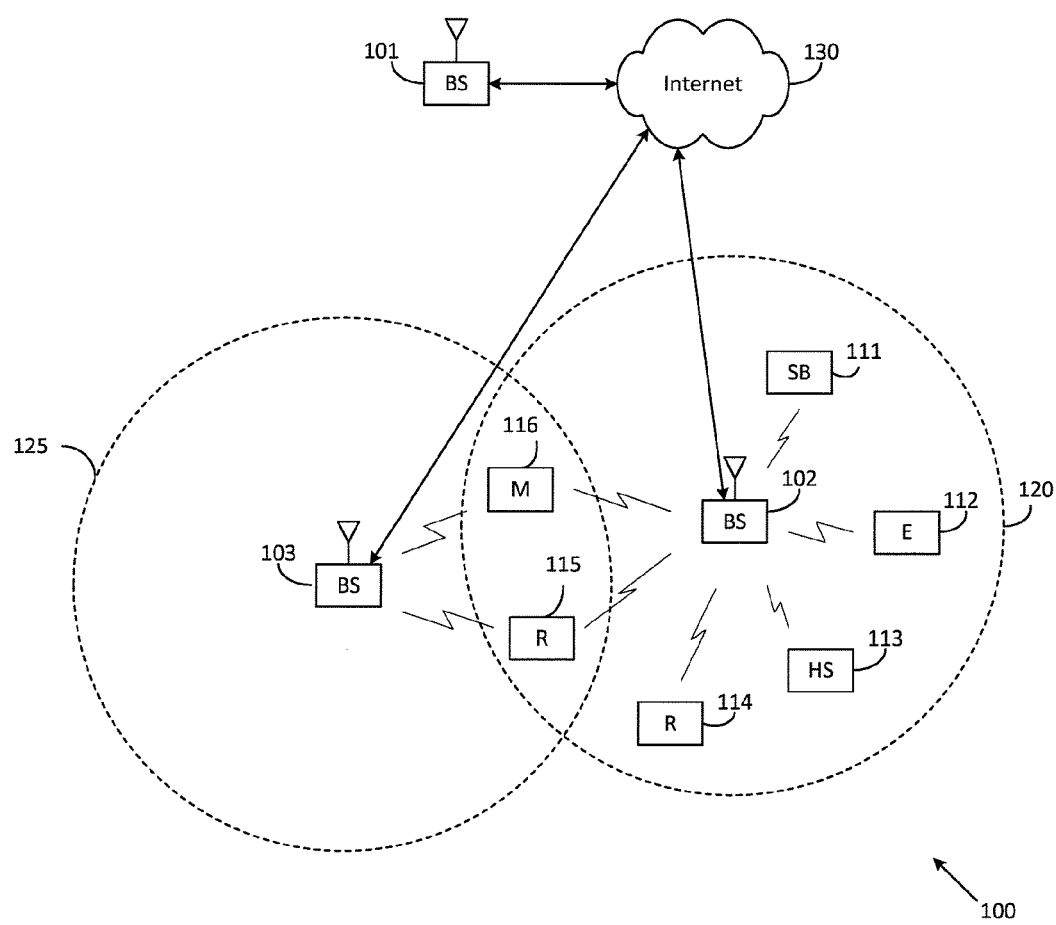
FIG. 1 illustrates an example wireless network according to embodiments of the present disclosure.

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The following documents and standards descriptions are hereby incorporated by reference into the present disclosure as if fully set forth herein: 3GPP TS 36.211 v12.4.0, "S-UTRA, Physical channels and modulation" (REF1); 3GPP TS 36.212 v12.3.0, "E-UTRA, Multiplexing and Channel coding" (REF2); and 3GPP TS 36.213 v12.4.0, "E-UTRA, Physical Layer Procedures" (REF3);

To achieve high performance, more accurate CSI information is needed at an eNB especially for FD-MIMO system. In one example, an amount of feedback information to transmit CSI may be excessive in terms of feedback requirements. The use of closely spaced large 2D antenna arrays (such as primarily geared toward high beamforming gain rather than spatial multiplexing) along with relatively small angular spread for each UE. Therefore, a compression or dimension reduction of the quantized channel feedback may be performed based on a fixed set of basic functions and/or vectors.

In another example, channel quantization parameters (such as channel angular spreads) in a low FD-MIMO mobility system are reported at a low rate (such as using UE-specific higher-layer signaling). In addition, CSI feedback is performed cumulatively.

In some embodiments, a scalable and FDD-enabling CSI feedback scheme for FD-MIMO is achieved according to a finite set of basic functions and/or vectors to reduce a number of coefficients when a downlink channel is quantized. In these embodiments, the number of coefficients needs to be quantized and reported from a UE to an eNB.

In one embodiment, from an uplink (UL) signal reception (such as UL-sounding reference signal (UL-SRS), UL-demodulation reference signal (UL-DMRS)), an eNB measures an angle of arrival (AoA) spread associated with each UE, denoted as $[\theta_{min}, \theta_{max}]$ and/or $[\varphi_{min}, \varphi_{max}]$ in an elevation (zenith) and/or azimuthal dimensions, respectively. The acquired AoA values ($\theta_{min}, \theta_{max}; \varphi_{min}, \varphi_{max}$), which represent downlink AoD values (angle of departure) assuming long-term DL-UL reciprocity, are signaled to the UE via a UE-specific medium such as higher-layer radio resource control (RRC) signaling or dynamic-broadcast channel (D-BCH). In addition, some other parameters are signaled as well. In this embodiment, configuration parameter(s) is associated with a choice of channel quantization sub-scheme (such as corresponding to a reduced subset of basic functions and/or vectors). Upon receiving the configuration parameter(s), the UE quantizes a MIMO channel according to the configured sub-scheme and reports (such as feeds back information) the quantized channel information to the eNB via an uplink channel. More specifically, the measuring and reporting procedures in such embodiment are updated, whenever the eNB updates the configuration parameter(s).

In such an embodiment, an overhead reduction from quantizing NTXA coefficients is achieved compared to a direct channel quantization scheme. In addition, basic functions and/or vectors at the UE is obtained using an eigenvalue decomposition (EVD) or a singular-value decomposition (SVD), and fed them back to the eNB. However, because EVD/SVD precoders are known to be sensitive to error (such as unintentional signal space cancellation) even when regularization is employed, a fixed set of basic functions and/or vectors can be utilized for more robustness.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As illustrated in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, that may be located in a small business (SB); a UE 112, that may be located in an enterprise (E); a UE 113, that may be located in a WiFi hotspot (HS); a UE 114, that may be located in a first residence (R); a UE 115, that may be located in a second residence (R); and a UE 116, that may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for vector quantization of feedback components such as channel coefficients. In certain embodiments, and one or more of the eNBs 101-103 includes circuitry, programming, or a combination thereof, for processing of vector quantized feedback components such as channel coefficients.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

Figure 2:
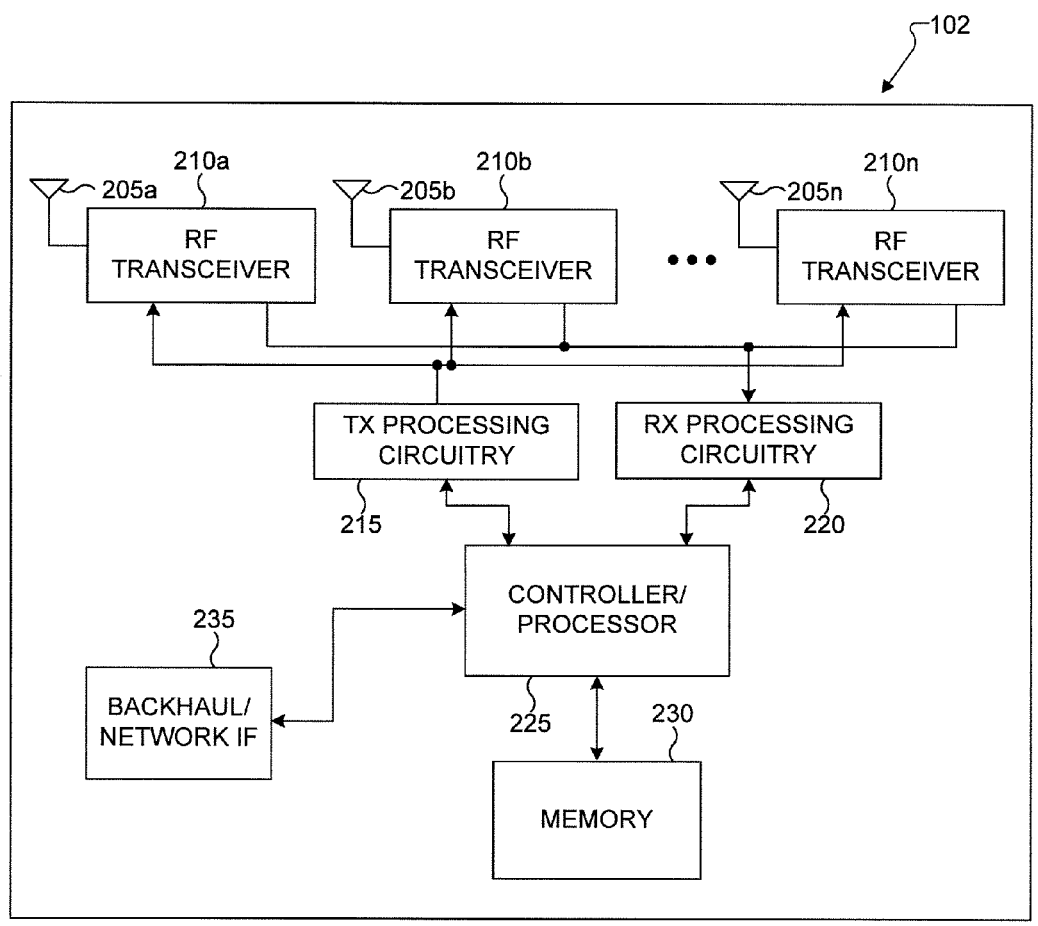
FIG. 2 illustrates an example eNB according to embodiments of the present disclosure.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programming, or a combination thereof for processing of vector quantized feedback components such as channel coefficients. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
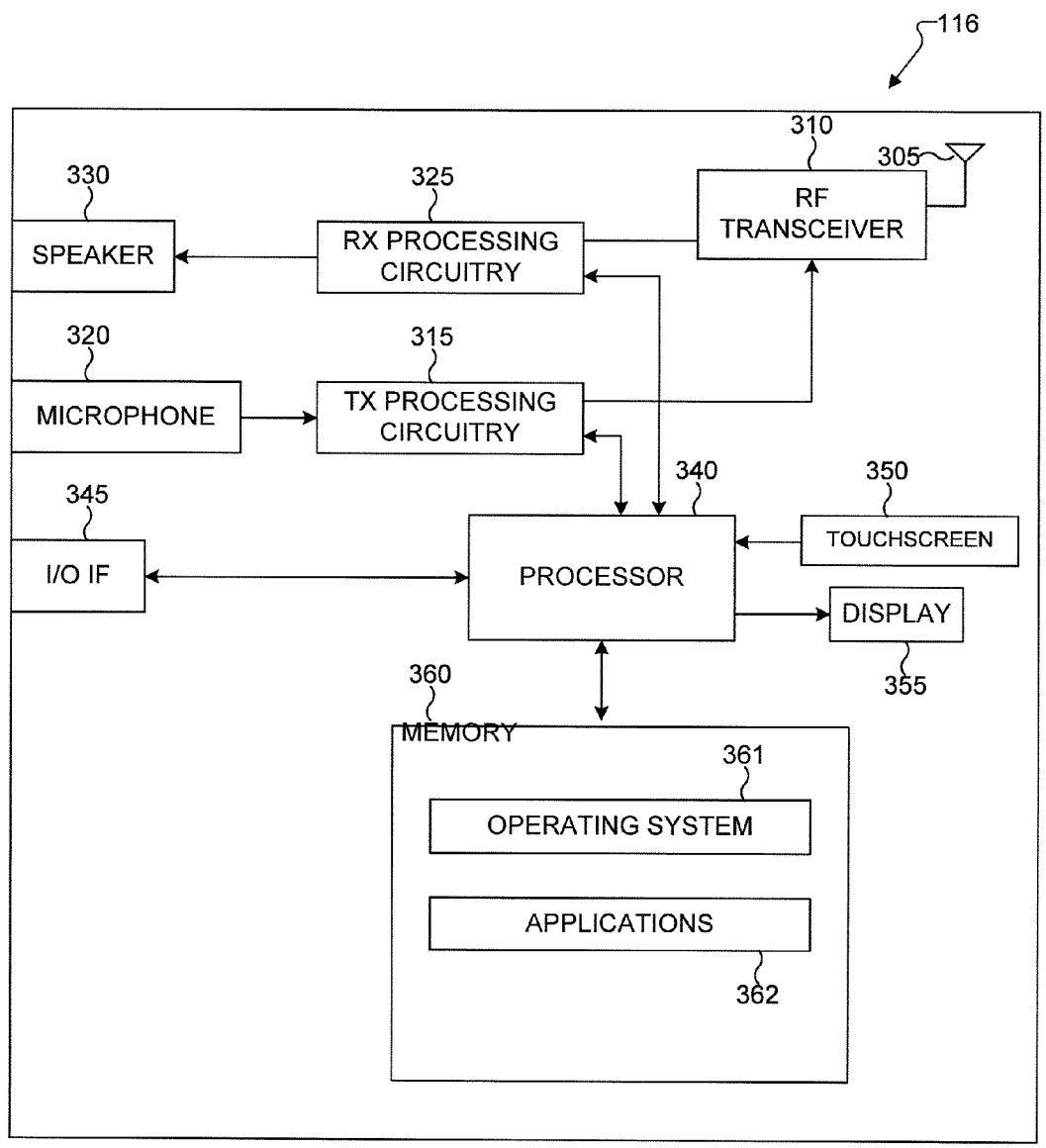
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for vector quantization of feedback components such as channel coefficients. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
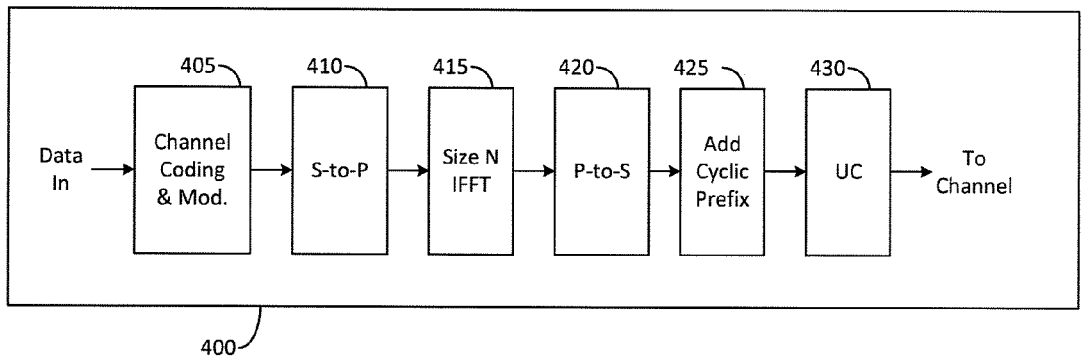
FIG. 4A illustrates a high-level diagram of an orthogonal frequency division multiple access transmit path according to embodiments of the present disclosure.
Figure 4B:
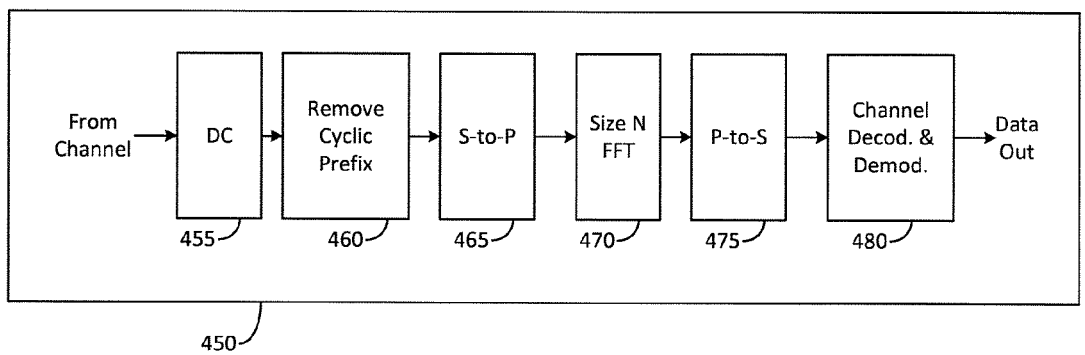
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (such as user equipment 116 of FIG. 1). In other examples, for uplink communication, the receive path circuitry 450 may be implemented in a base station (such as eNB 102 of FIG. 1) or a relay station, and the transmit path circuitry 400 may be implemented in a user equipment (such as user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (such as Rel.12 LTE) precoding framework (such as PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (such as the channel angular spreads) may be obtained at low mobility using a UE-specific higher-layer signaling. In addition, a CSI feedback may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, such as 64). This avoids having to support excessively high dimension for open-loop transmit diversity that reduces CSI feedback overhead and improves robustness when CSI measurement quality is questionable.

Figure 5:
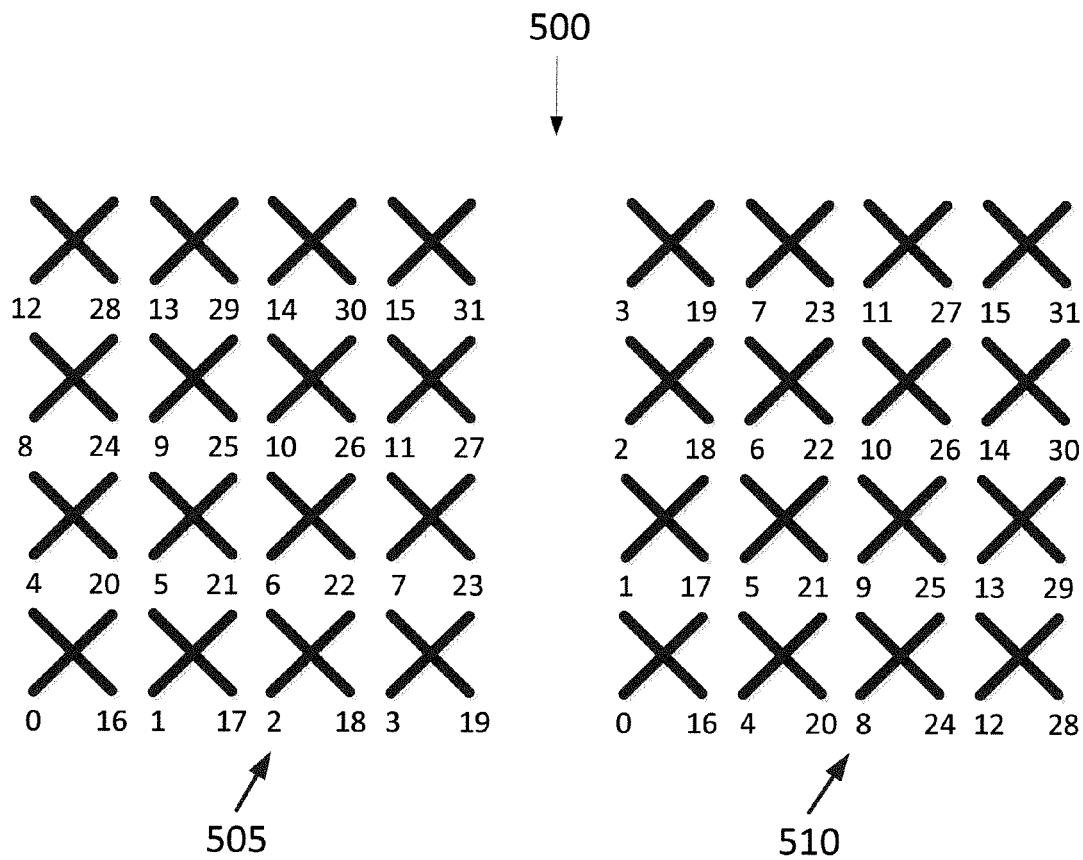
FIG. 5 illustrates an example of a 2 dimensional (2D) antenna array including an index of 4×4 dual polarized antenna array according to the present disclosure.

FIG. 5 illustrates an example of a 2 dimensional (2D) antenna array 500 including an index of 4×4 dual polarized antenna array according to the present disclosure. The embodiment of the 2D antenna array 500 shown in FIG. 5 is for illustration only. Other embodiments of the 2D antenna array 500 could be used without departing from the scope of this disclosure.

As illustrated in FIG. 5, an exemplary 2D antenna array 500 that is constructed from 16 dual-polarized antenna elements arranged in a 4×4 rectangular format. In this illustration, each labelled antenna element is logically mapped onto a single antenna port. Two alternative labelling conventions are depicted for illustrative purposes (such as horizontal first 505 and vertical first in 510). In general, one antenna port corresponds to multiple antenna elements (such as physical antennas) combined via a virtualization. The 4×4 dual polarized array antenna is viewed as 16×2=32-element array of elements. A vertical dimension (such as consisting of 4 rows) facilitates elevation beamforming in addition to an azimuthal beamforming across a horizontal dimension (such as consisting of 4 columns of dual polarized antennas). While fixed beamforming (such as antenna virtualization) is implemented across the elevation dimension, it is unable to reap the potential gain offered by a spatial and frequency selective nature of the channel.

In one embodiment, MIMO precoding (for spatial multiplexing) is performed either with CRS or UE-specific RS. In either case, each UE operating in spatial multiplexing mode(s) is configured to report CSI that may contain PMI (such as precoding codebook index). A PMI report is derived from one of the following sets of standardized codebooks (such as LTE), for example, Two antenna ports, Four antenna ports, and Eight antenna ports.

In this embodiment, a UE that operates in spatial multiplexing mode(s) is configured to report CSI that contains PMI (such as precoding codebook index). In this embodiment, a PMI report is derived from one of the following sets of codebooks; two antenna ports, four antenna ports, and eight antenna ports. In this embodiment, if an eNB follows a PMI recommendation from a UE, the eNB is expected to precode the eNB's transmitted signal according to a recommended precoding vector or matrix for a given subframe and resource block (RB). Regardless whether the eNB follows the recommendation, the UE is configured to report the PMI according to the configured precoding codebook. The PMI including a single index or a pair of indices is associated with a precoding matrix W of size $N_c \times N_L$ where $N_c$ is a number of antenna ports in one row (such as a number of columns) and $N_L$ is a number of transmission layers. If only one row is utilized, one dimensional array is considered.

Table 1 and Table 2 describe codebooks for rank-1 and rank-2 CSI reporting for UEs configured to receive 8-antenna-port transmissions. A particular codeword (such as a vector or a matrix) in a codebook is uniquely specified with two indices $i_1$ and $i_2$. To describe the two codebooks, the following two variables are defined as the equation (1):

$$\varphi_n = e^{j\pi n/2}$$
$$v_m = [1 \quad e^{j2\pi m/32} \quad e^{j4\pi m/32} \quad e^{j6\pi m/32}]^T$$

TABLE 2

| $i_1$ | $i_2$ = 0 | 1 | 2 | 3 |
|---|---|---|---|---|
| 0–15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |

| $i_1$ | $i_2$ = 4 | 5 | 6 | 7 |
|---|---|---|---|---|
| 0–15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |

| $i_1$ | $i_2$ = 8 | 9 | 10 | 11 |
|---|---|---|---|---|
| 0–15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |

| $i_1$ | $i_2$ = 12 | 13 | 14 | 15 |
|---|---|---|---|---|
| 0–15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where
$$W^{(2)}_{m,m',n} = \frac{1}{4}\begin{bmatrix} v_m & v_{m'} \\ \varphi_n v_m & -\varphi_n v_{m'} \end{bmatrix}$$

If the most recently reported RI is 2, m, m' and n are derived with the two indices $i_1$ and $i_2$ according to Table 2 resulting in a rank-2 precoding matrix $$W^{(2)}_{m,m',n} = \frac{1}{4}\begin{bmatrix} v_m & v_{m'} \\ \varphi_n v_m & -\varphi_n v_{m'} \end{bmatrix}.$$

TABLE 1

| $i_1$ | $i_2$ = 0 | 1 | 2 | 3 | 4 | 5 | 6 | 7 |
|---|---|---|---|---|---|---|---|---|
| 0–15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ | $W^{(1)}_{2i_1+1,2}$ | $W^{(1)}_{2i_1+1,3}$ |

| $i_1$ | $i_2$ = 8 | 9 | 10 | 11 | 12 | 13 | 14 | 15 |
|---|---|---|---|---|---|---|---|---|
| 0–15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where
$$W^{(1)}_{m,n} = \frac{1}{\sqrt{8}}\begin{bmatrix} v_m \\ \varphi_n v_m \end{bmatrix},$$

If the most recently reported rank indicator (RI) is 1, m and n are derived with the two indices $i_1$ and $i_2$ according to Table 1 that results in a rank-1 precoding vector $$W^{(1)}_{m,n} = \frac{1}{\sqrt{8}}\begin{bmatrix} v_m \\ \varphi_n v_m \end{bmatrix}.$$

The precoding codebooks are utilized for CSI reporting. Two classes of CSI reporting modes are supported, for example, a physical uplink shared channel (PUSCH)-based aperiodic CSI (A-CSI) and a physical uplink control channel (PUCCH)-based periodic CSI (P-CSI). In each class, different modes are defined based on frequency selectivity of (channel quality indicator) CQI and/or PMI, that is, whether wideband or subband reporting is performed. The supported CSI reporting modes are given in Table 3 and Table 4.

TABLE 3

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 4

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

As a number of antenna elements increase (such as up to 8 rows of four dual-polarized antennas that amounts to 64 elements), significantly larger precoding codebooks are needed. In addition, as multi-user MIMO (MU-MIMO) becomes a dominant scheduling strategy, obtaining a good multi-user pairing from single-user PMIs that is received from the active UEs has proved to be challenging. Hence, a conventional CSI feedback scheme limits the potential of FD-MIMO, especially in FDD scenarios where channel reciprocity is limited to long-term channel statistics at best.

In addition, CSI-RS resources are expensive and needs to be managed efficiently. Therefore, a number of CSI-RS resources per UE in addition to improving CSI-RS coverage needs to be reduced. In addition, for FD-MIMO that utilizes a 2D antenna array (such as 2D precoding), a scalability (such as a number and geometry of transmit antennas) and flexibility of CSI feedback scheme (such as in addition to efficient utilization of CSI-RS resources) are significant parameters for high performance of FD-MIMO. To achieve high performance, more accurate CSI (such as in terms of quantized MIMO channel) is needed at an eNB. This is especially a case for FDD scenarios where short-term reciprocity is infeasible.

According to the present disclosure, the following properties of FD-MIMO are considered for the embodiments of this disclosure: 1) the use of closely spaced large 2D antenna arrays (such as primarily geared toward high beamforming gain rather than spatial multiplexing) along with relatively small angular spread for each UE. This allows "compression" or "dimensionality reduction" of the quantized channel feedback. In this case, a set of basic functions and/or vectors is used and a quantization basically expresses an MIMO channel in terms of a linear combination of the basic functions and/or vectors. 2) Low mobility as the target scenario for an FD-MIMO: possibility to update quantization parameters (long-term channel statistics such as channel angular spread) at a low rate (such as using UE-specific higher-layer signaling), in addition, CSI feedback is also performed cumulatively. 3) A number of CSI-RS ports per UE are reduced and/or CSI-RS coverage is improved. Therefore, CSI-RS is more utilized. 4) While time-varying basis functions/vectors are used (such as derived from EVD or SVD and fed back from the UE to the eNB), small channel angular spread warrants the use of a fixed master-set of basic functions and/or vectors derived primarily from the channel angular spread characteristics. For a given channel angular spread characteristic, a subset of the fixed master-set (such as pre-known both at the UE and the eNB) is chosen by the eNB and signaled to a UE.

A transmit (TX) precoder associated with each of the UEs (such as UE-n) is written as following equation (1):

$$W = W_L V \quad (1)$$

Assuming that a total number of TX antennas or transceiver units that corresponds to the number of CSI-RS ports at an eNB is $N_{TX}$ and a transmission rank (such as a number of transmission layers) is $N_L$, a size of the precoder matrix W is $N_{TX} \times N_L$. For dual-polarized array like that depicted in FIG. 5 with $N_r$ rows and $N_c$ columns, the number of TX antennas is $N_{TX}=2N_r N_c$. The precoder is either a channel representation (such as channel quantization of $H^{(q,f)}$, that is, the channel associated with the q-th RX antenna and the f-th subband) or a precoder/beamformer representation (such as a vector or matrix corresponding to eigenvector(s)). In the second case, the precoder is computed either assuming a single-user (SU) or a multi-user (MU) transmission hypothesis. Here $W_L$ denotes the long-term component associated with the aforementioned AoD profile that includes a subset of basic vectors and/or functions and a short-term component V associated with a linear transformation of a long-term component (such as a linear combination of the subset of basic functions/vectors).

For the long-term precoder component $W_L$ in the equation (1), a wideband precoding (such as the same precoder for all subbands) is sufficient. The short-term component V, on the other hand, is benefited from subband precoding. However, the subband precoding for $W_L$ is needed for higher frequency bands such as millimeter wave (mmWave) communication system where much wider system bandwidth is used.

For a 2D rectangular array, a Kronecker structure is used for a precoder design. In that case, the equation (1) is written in two equivalent forms as following equation (2):

$$W = (W_{L,v} V_v) \otimes (W_{L,h} V_h) = (W_{L,v} \otimes W_{L,h})(V_v \otimes V_h) \quad (2)$$

where h and v denote horizontal and vertical dimensions.

The first form implies that an overall precoder W is decomposed into vertical and horizontal components via Kronecker product. The second form implies that either a long-term or a short-term precoder is decomposed into vertical and horizontal components via Kronecker product.

Alternatively, the Kronecker structure is applied only to the first precoding stage while the second precoding stage performs a linear transformation to the first-stage precoding matrix. In that case, the product precoder is described as following equation (2A):

$$W = (W_{L,v} \otimes W_{L,h}) V \quad (2A)$$

A special case for (2A) is constructed when one of the dimensions (such as vertical) only performs one-layer long-term precoding. In that case, $W = (w_{L,v} \otimes W_{L,h}) V_h$. The equation (1) facilitates a flexible and all-encompassing scheme for an FD-MIMO that accommodates deployment scenarios. For example, when a short-term precoding matrix V is fed back, some possibilities are offered. In one example, no feedback of $W_L$. CSI-RS is precoded (such as beamformed) with $W_L$ or a UE-specific precoding matrix. In this situation, a UE recommendation of precoder V is chosen transparent to $W_L$ or the UE-specific precoding matrix used at an eNB.

In another example, no feedback of $W_L$. CSI-RS is not precoded (such as beamformed) with $W_L$ but the eNB configures the UE with a set of basic vectors that represents $W_L$. In this example, a UE recommendation of precoder V is chosen conditioned upon $W_L$ configured by an eNB. In another example, a UE feedback of $W_L$. CSI-RS is not precoded (such as beamformed) with $W_L$ (although it is possible to precode CSI-RS in that case $W_L$ is a subset of the precoding applied to CSI-RS). In this example, a UE recommendation of precoder V is chosen conditioned upon $W_L$ that is also computed and chosen by the UE.

In such examples, there is no need to feedback $W_L$ and some of properties are desirable in implementing CSI feedback scheme(s). In one example, an ability to turn on and off $W_L$ feedback is desired for the aforementioned examples such as either no feedback of $W_L$. CSI-RS is precoded or not-precoded. In another example, an ability to turn on and off V feedback is desired when only a long-term 2D beamforming is needed. In another example, for rectangular arrays (or in general 2D rectangular antenna array), the situation that no feedback of $W_L$. CSI-RS is precoded is expanded to the situation that no feedback of $W_L$. CSI-RS is not precoded. In addition, a reporting of two different dimensions (such as h and v) of the same CSI in a self-contained manner is desired. Therefore, $W_{L,v}$ and $W_{L,h}$ are to be reported together; and likewise, $V_v$ and $V_h$ because either $W_L$ or V is not complete without both horizontal and vertical components.

In a conventional scheme, multiple CSI processes are assigned per UE and one process is assigned as a reference process for a purpose of rank inheritance (such as reference rank). Conversely, in the present disclosure, a linkage between a CSI reference process/resource and the other CSI processes takes place in a value of rank indicator (RI) for a given CSI mode. In some embodiments, for mode 1-1 P-CSI, a wideband PMI/CQI is calculated in accordance with the most recent periodic RI report. However, this scheme is unrelated to the reported A-CSI. In some embodiments, for mode 3-2 A-CSI, a CQI/PMI is calculated in accordance with an RI that is reported together with the aperiodic CQI/PMI. Therefore, there is no linkage between A-CSI and P-CSI. In some embodiments, to support a coordinated multipoint transmission and reception (CoMP), a feature called an RI inheritance or linkage is supported where a CSI reference process is defined. When the CSI process 1 is a reference process while CSI process 2 is a dependent process. Therefore, there is no linkage between a P-CSI and an A-CSI. In terms of RI. In such embodiments, the RI in the A-CSI of the CSI process 1 is inherited by (such as imposed on) the RI in the A-CSI of the CSI process 2. In addition, the RI in the P-CSI of the CSI process 1 is inherited by (such as imposed on) the RI in the P-CSI of the CSI process 2. In some embodiments, in case of A-CSI, a UE feedback is triggered by a CSI request field in an UL grant (such as either DCI format 0 or 4 in LTE specification). Currently, a context of this field is given in Table 5. A 2-bit field is used to facilitate cell aggregation as well as multiple CSI processes and measurements.

TABLE 5

CSI Request field

Format 0

CSI request - 1 or 2 bits as defined. The 2-bit field applies to
    UEs that are configured with more than one DL cell and when
the corresponding downlink control information (DCI) format is mapped
onto the UE specific search space given by the cell-radio network
temporal identifier (C-RNTI);
    UEs that are configured by higher layers with more than one
CSI process and when the corresponding DCI format is mapped onto
the UE specific search space given by the C-RNTI;
    UEs that are configured with two CSI measurement sets by
higher layers with the parameter csi-MeasSubframeSet, and when the
corresponding DCI format is mapped onto the UE specific search space
given by the C-RNTI; otherwise the 1-bit field applies Format 4

CSI request - 1 or 2 bits. The 2-bit field applies to
    UEs that are configured with more than one DL cell;
    UEs that are configured by higher layers with more than
one CSI process;
    UEs that are configured with two CSI measurement sets by
higher layers with the parameter csi-MeasSubframeSet, and when the
corresponding DCI format is mapped onto the UE specific search space
given by the C-RNTI; otherwise the 1-bit field applies In the following, for brevity, an FDD is considered as the duplex method for both DL and UL signaling but the embodiments of this disclosure are also directly applicable to a time division duplexing (TDD). Terms such as 'non-precoded' (NP) CSI-RS and 'beamformed' (BF) CSI-RS re-used throughout the present disclosure. This disclosure does not change when different terms or names are used to refer to these two CSI-RS types. For example, 'CSI-RS-A' (such as a first CSI-RS) and 'CSI-RS-B' (such as a second CSI-RS) may refer to or be associated with these two CSI-RS types. The same holds for CSI-RS resource. CSI-RS resources associated with these two types of CSI-RS may be referred to as 'a first CSI-RS resource' and 'a second CSI-RS resource', or 'CSI-RS-A resource' and 'CSI-RS-B resource'.

As illustrated in FIG. 5 (such as a dual-polarized array), horizontal is associated with a linear dual-polarized array and vertical is associated with a linear single-polarized array. In some embodiments (such as scenario A), a feeding back PMI value(s) for $W_L$ is not needed or performed. That is, only PMI value(s) for V is fed back. In such embodiments, a partial PMI reporting is performed when a UE receives, measures, or is configured with a type of CSI-RS (such as precoded or beamformed CSI-RS) at a particular instance (subframe). In such embodiments, a UE is also configured with a CSI reporting type or mode that is specified with the partial PMI reporting.

In one embodiment, an aperiodic CSI (A-CSI) reporting on PUSCH is performed. In such embodiment, a CQI, a PMI that includes i1 and i2 (such as two fields associated with W1 and W2), and RI are included. In addition, the CQI and RI, four PMI fields associated with the following precoder components are needed (cf. (2)): $\{W_{L,v}, W_{L,h}, V_v, V_h\}$ that is denoted as $\{i_{1,v}, i_{1,h}, i_{2,v}, i_{2,h}\}$ or $\{i_{1,1}, i_{1,2}, i_{2,1}, i_{2,2}\}$, respectively. Here, $i_{m,n}$ denotes a PMI associated with the m-th stage precoding (such as m=1, 2) and n-th dimension (note that the 1$^{st}$ dimension is not necessarily vertical). However, only UE recommendation for $\{V_v, V_h\}$ (associated with two PMI fields $\{i_{2,v}, i_{2,h}\}$ or $\{i_{2,1}, i_{2,2}\}$) needs to be reported. In the UE's usage for or with precoded (such as beamformed) CSI-RS, the UE measures at least one beamformed CSI-RS beam direction each of which includes two ports for dual-polarized arrays that is represented in a rectangular (such as Kronecker product) pattern. Therefore, the PMI associated with V that is represented as a Kronecker product of $V_v$ and $V_h$ is represented as two PMIs $\{i_{2,v}, i_{2,h}\}$ or $\{i_{2,1}, i_{2,2}\}$. This corresponds to the equation (2). The PMI fields are reported either as wideband PMIs (assuming the "set S sub-bands") or subband PMIs depending on the CSI reporting mode.

Alternatively, three PMI fields associated with the following precoder components is used: $\{W_{L,v}, W_{L,h}, V\}$ that is denoted as $\{i_{1,v}, i_{1,h}, i_2\}$ or $\{i_{1,1}, i_{1,2}, i_2\}$, respectively. In the UE's usage for or with precoded (such as beamformed) CSI-RS, if the UE measures at least one beamformed CSI-RS beam direction each of which includes two ports for dual-polarized arrays that is not represented in a rectangular (such as Kronecker product) pattern, the PMI associated with V is represented as one PMI $i_2$. This corresponds to the equation (2A). The PMI fields are reported either as wideband PMIs (assuming the "set S sub-bands") or subband PMIs depending on the CSI reporting mode.

In some embodiment, a periodic CSI (P-CSI) reporting on PUCCH is performed. In such embodiment, a larger payload is needed since V (such as for FD-MIMO) carries amplitude information. In such embodiment, a CQI, a PMI that includes i1 and i2 (such as two fields, associated with W1 and W2), and an RI are included. In addition to the CQI and the RI, four PMI fields associated with the following precoder components are needed (cf. (2)): $\{W_{L,v}, W_{L,h}, V_v, V_h\}$ that is denoted as $\{i_{1,v}, i_{1,h}, i_{2,v}, i_{2,h}\}$ or $\{i_{1,1}, i_{1,2}, i_{2,1}, i_{2,2}\}$, respectively. Here, $i_{m,n}$ denotes the PMI associated with the m-th stage precoding (such as m=1,2) and n-th dimension (such as the $1^{st}$ dimension is not necessarily vertical). However, only UE recommendation for $\{V_v, V_h\}$ (such as two PMI fields) needs to be reported. In the UE's usage for or with precoded (such as beamformed) CSI-RS, the UE measures at least one beamformed CSI-RS beam direction each of which includes two ports for dual-polarized arrays that is represented in a rectangular (such as Kronecker product) pattern. Therefore, the PMI associated with V that is represented as a Kronecker product of $V_v$ and $V_h$) is represented as two PMIs $\{i_{2,v}, i_{2,h}\}$ or $\{i_{2,1}, i_{2,2}\}$. This corresponds to the equation (2). These PMI fields are reported either as wideband PMIs (such as assuming the "set S sub-bands") or subband PMIs depending on the CSI reporting mode.

Alternatively, three PMI fields associated with the following precoder components are used: $\{W_{L,v}, W_{L,h}, V\}$ that is denoted as $\{i_{1,v}, i_{1,h}, i_2\}$ or $\{i_{1,1}, i_{1,2}, i_2\}$, respectively. In the UE's usage for or with precoded (such as beamformed) CSI-RS, if the UE measures at least one beamformed CSI-RS beam direction each of which includes two ports for dual-polarized arrays that is not represented in a rectangular (such as Kronecker product) pattern, the PMI associated with V is represented as one PMI $i_2$. This corresponds to the equation (2A). The PMI fields are reported either as wideband PMIs (such as assuming the "set S sub-bands") or subband PMIs depending on the CSI reporting mode.

For P-CSI, in addition to PUCCH format 2/2a/2b, PUCCH format 3 (such as up to 22-bit payload) is utilized to report PMI. When PUCCH format 3 is utilized, all the CSI reporting parameters ($\{CQI, RI, i_{1,v}, i_{1,h}\}$ or $\{CQI, RI, i_{1,1}, i_{1,2}\}$ or $\{CQI, RI, i_2\}$) are included in one reporting instance, all within one subframe. Alternatively, another (such as a new) PUCCH format that supports a higher maximum payload is used.

In such embodiments, at least one corresponding CQI is calculated assuming the use of the precoding matrix (or matrices) corresponding to $\{i_{2,v}, i_{2,h}\}$ or $\{i_{2,1}, i_{2,2}\}$ or $\{i_2\}$. Depending on a CSI reporting mode, each of PMI values (such as precoding matrices) is wideband (such as assuming transmission on set S subbands) or subband (such as assuming transmission only in the subband). The reported PMI and CQI values are calculated conditioned on the reported RI. In addition, in such embodiment, a codebook subset restriction or a codebook subsampling is applied to at least one of the PMI components ($\{i_{2,v}, i_{2,h}\}$ or $\{i_{2,1}, i_{2,2}\}$ or $\{i_2\}$) to reduce a number of precoder hypotheses associated with the PMI value(s). A feedback payload (such as a number of bits required or used to represent a precoder hypothesis) is determined based on the chosen codebook subset (or subsampled codebook) rather than a full codebook.

From UE perspective, The UE measures $N_P=2N_{b,v} N_{b,h}$ (such as assuming dual-polarized antenna array) precoded (such as beamformed) CSI-RS ports. A number of ports $N_P$ is signaled to the UE dynamically via a DL control channel or semi-statically via higher-layer (RRC) configuration pertaining to non-zero-power (NZP) CSI-RS resource. In one embodiment, this resource is associated with a type of CSI-RS such as precoded (such as beamformed) CSI-RS. These set of ports are associated with a 2D Kronecker codebook. The UE reports a set of PMIs $\{i_{2,v}, i_{2,h}\}$ or $\{i_{2,1}, i_{2,2}\}$ corresponding to recommended precoder $\{V_v, V_h\}$. The hypothesized $V_h$ precoder (such as for dual-polarized linear array) is associated with any of the following exemplary operations. Operation 1) selecting at least one out of $N_{b,h}$ beam directions for each polarization and co-phasing (such as via scalar multiplication) between two polarizations. Operation 2) linear combination of $N_{b,h}$ beam directions for each polarization and co-phasing (such as via scalar multiplication) between two polarizations. Operation 3) if $N_{b,h}=1$, the aforementioned two examples of operations are reduced to co-phasing between two polarizations only.

In one example, for transmission rank of 1, a beam-selection-co-phasing codebook for $V_h$ is described as equation (3):

$$V_h = \frac{1}{\sqrt{2}}\begin{bmatrix} u \\ e^{j\phi}u \end{bmatrix}, \quad (3)$$

$$\phi \in \left\{0, \frac{2\pi}{N}, \frac{4\pi}{N}, \ldots, \frac{2\pi(N-1)}{N}\right\},$$

$$u \in \left\{\begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix}\right\}$$

For example, with $N_{b,h}=2$, and N=4 (such as QPSK scaling), the equation (3) is described as following equation (3A) (such as resulting in a size-8 codebook)

$$V_h \in \left\{\frac{1}{\sqrt{2}}\begin{bmatrix} 1 \\ 0 \\ \pm 1 \\ 0 \end{bmatrix}, \frac{1}{\sqrt{2}}\begin{bmatrix} 0 \\ 1 \\ 0 \\ \pm 1 \end{bmatrix}, \frac{1}{\sqrt{2}}\begin{bmatrix} 1 \\ 0 \\ \pm j \\ 0 \end{bmatrix}, \frac{1}{\sqrt{2}}\begin{bmatrix} 0 \\ 1 \\ 0 \\ \pm j \end{bmatrix}\right\} \quad (3A)$$

This codebook can be further described by the following examples in Tables 6A and 6B. The mappings between index $i_2$ and precoding vector $V_h$ in Table 6A and Table 6B are exemplary.

TABLE 6A

| $i_2$ | $V_h$ | Comment |
|---|---|---|
| 0 | $\frac{1}{\sqrt{2}}\begin{bmatrix}1\\0\\1\\0\end{bmatrix}$ | Select $1^{st}$ port (beam direction), cophase with +1 |
| 1 | $\frac{1}{\sqrt{2}}\begin{bmatrix}1\\0\\j\\0\end{bmatrix}$ | Select $1^{st}$ port (beam direction), cophase with +j |
| 2 | $\frac{1}{\sqrt{2}}\begin{bmatrix}1\\0\\-1\\0\end{bmatrix}$ | Select $1^{st}$ port (beam direction), cophase with -1 |
| 3 | $\frac{1}{\sqrt{2}}\begin{bmatrix}1\\0\\-j\\0\end{bmatrix}$ | Select $1^{st}$ port (beam direction), cophase with -j |
| 4 | $\frac{1}{\sqrt{2}}\begin{bmatrix}0\\1\\0\\1\end{bmatrix}$ | Select $2^{nd}$ port (beam direction), cophase with +1 |
| 5 | $\frac{1}{\sqrt{2}}\begin{bmatrix}0\\1\\0\\j\end{bmatrix}$ | Select $2^{nd}$ port (beam direction), cophase with +j |
| 6 | $\frac{1}{\sqrt{2}}\begin{bmatrix}0\\1\\0\\-1\end{bmatrix}$ | Select $2^{nd}$ port (beam direction), cophase with -1 |
| 7 | $\frac{1}{\sqrt{2}}\begin{bmatrix}0\\1\\0\\-j\end{bmatrix}$ | Select $2^{nd}$ port (beam direction), cophase with -j |

TABLE 6B

| $i_2$ | $V_h$ | Comment |
|---|---|---|
| 0 | $\frac{1}{\sqrt{2}}\begin{bmatrix}1\\0\\1\\0\end{bmatrix}$ | Select $1^{st}$ port (beam direction), cophase with +1 |
| 1 | $\frac{1}{\sqrt{2}}\begin{bmatrix}1\\0\\-1\\0\end{bmatrix}$ | Select $1^{st}$ port (beam direction), cophase with -1 |
| 2 | $\frac{1}{\sqrt{2}}\begin{bmatrix}1\\0\\j\\0\end{bmatrix}$ | Select $1^{st}$ port (beam direction), cophase with +j |
| 3 | $\frac{1}{\sqrt{2}}\begin{bmatrix}1\\0\\-j\\0\end{bmatrix}$ | Select $1^{st}$ port (beam direction), cophase with -j |
| 4 | $\frac{1}{\sqrt{2}}\begin{bmatrix}0\\1\\0\\1\end{bmatrix}$ | Select $2^{nd}$ port (beam direction), cophase with +1 |
| 5 | $\frac{1}{\sqrt{2}}\begin{bmatrix}0\\1\\0\\-1\end{bmatrix}$ | Select $2^{nd}$ port (beam direction), cophase with -1 |
| 6 | $\frac{1}{\sqrt{2}}\begin{bmatrix}0\\1\\0\\j\end{bmatrix}$ | Select $2^{nd}$ port (beam direction), cophase with +j |
| 7 | $\frac{1}{\sqrt{2}}\begin{bmatrix}0\\1\\0\\-j\end{bmatrix}$ | Select $2^{nd}$ port (beam direction), cophase with -j |

A hypothesized $V_v$ precoder (such as for single-polarized linear array) is associated with any of the following exemplary operations. Operation 1) selecting at least one out of $N_{b,v}$ beam directions, operation 2) linear combination of $N_{b,v}$ beam directions, and operation 3) if $N_{b,v}=1$, no short-term PMI is needed for the vertical dimension. In one example, for transmission rank of 1, a beam-selection codebook for $V_v$ is described as following equation (4):

$$V_v \in \left\{ \begin{bmatrix}1\\0\\\vdots\\0\end{bmatrix}, \begin{bmatrix}0\\1\\\vdots\\0\end{bmatrix}, \ldots, \begin{bmatrix}0\\0\\\vdots\\1\end{bmatrix} \right\} = \{d_0, d_1, \ldots, d_{N_{b,v}-1}\} \quad (4)$$

A vector $d_n$ is a length-$N_{b,v}$ vector with all zeros except at the n-th position. As a result, a 2D codebook for V is constructed from a Kronecker product between the vertical and the horizontal codebooks based on the relation $V=V_v \otimes V_h$.

From UE perspective, a UE measures $N_P$ precoded (such as beamformed) CSI-RS ports and reports a PMI corresponding to recommended precoder V. For dual-polarized array, $N_P$ is an even number since $N_P$ includes two polarizations for each beam direction. A number of ports $N_P$ is signaled to the UE dynamically via a DL control channel or semi-statically via higher-layer (RRC) configuration pertaining to non-zero-power (NZP) CSI-RS resource. In one embodiment, this resource is associated with a type of CSI-RS such as precoded (such as beamformed) CSI-RS. The UE reports a set of PMIs $\{i_2\}$ corresponding to recommended precoder $\{V\}$. A hypothesized precoder is associated with any of the following exemplary operations. Operation 1) selecting at least one out of $N_P/2$ beam directions for each polarization and co-phasing (via scalar multiplication) between two polarizations, operation 2) linear combination of $N_P/2$ beam directions for each polarization and co-phasing (such as via scalar multiplication) between two polarizations, and operation 3) if $N_P=2$, the aforementioned two examples are reduced to co-phasing between two polarizations only. In one example, for transmission rank of 1, a beam-selection-co-phasing codebook for V is described as following equation (5):

$$V = \frac{1}{\sqrt{2}} \begin{bmatrix} u \\ e^{j\phi} u \end{bmatrix}, \quad (5)$$

$$\phi \in \left\{0, \frac{2\pi}{N}, \frac{4\pi}{N}, \ldots, \frac{2\pi(N-1)}{N}\right\},$$

$$u \in \left\{\begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix}\right\}$$

For example, with $N_P=8$, and $N=4$ (such as QPSK scaling), the equation (5) is described as following equation (5A.1) (such as resulting in a size-16 codebook):

$$V \in \left\{\frac{1}{\sqrt{2}}\begin{bmatrix} d_0 \\ \pm d_0 \end{bmatrix}, \frac{1}{\sqrt{2}}\begin{bmatrix} d_1 \\ \pm d_1 \end{bmatrix}, \frac{1}{\sqrt{2}}\begin{bmatrix} d_2 \\ \pm d_2 \end{bmatrix}, \frac{1}{\sqrt{2}}\begin{bmatrix} d_3 \\ \pm d_3 \end{bmatrix}, \right. \quad (5A.1)$$

$$\left. \frac{1}{\sqrt{2}}\begin{bmatrix} d_0 \\ \pm j d_0 \end{bmatrix}, \frac{1}{\sqrt{2}}\begin{bmatrix} d_1 \\ \pm j d_1 \end{bmatrix}, \frac{1}{\sqrt{2}}\begin{bmatrix} d_2 \\ \pm j d_2 \end{bmatrix}, \frac{1}{\sqrt{2}}\begin{bmatrix} d_3 \\ \pm j d_3 \end{bmatrix}\right\}$$

where $d_n$ is a length-4 vector with all zeros except at the n-th position (n=0, 1, 2, 3). For instance, $$d_1 = \begin{bmatrix} 0 \\ 1 \\ 0 \\ 0 \end{bmatrix}.$$

In one example, the equation (5A.1) is equivalently described as following equation (5A.2):

$$V \in \left\{\begin{array}{l} \frac{1}{\sqrt{2}}\begin{bmatrix} d_0 \\ d_0 \end{bmatrix}, \frac{1}{\sqrt{2}}\begin{bmatrix} d_0 \\ -d_0 \end{bmatrix}, \frac{1}{\sqrt{2}}\begin{bmatrix} d_0 \\ jd_0 \end{bmatrix}, \frac{1}{\sqrt{2}}\begin{bmatrix} d_0 \\ -jd_0 \end{bmatrix}, \\ \frac{1}{\sqrt{2}}\begin{bmatrix} d_1 \\ d_1 \end{bmatrix}, \frac{1}{\sqrt{2}}\begin{bmatrix} d_1 \\ -d_1 \end{bmatrix}, \frac{1}{\sqrt{2}}\begin{bmatrix} d_1 \\ jd_1 \end{bmatrix}, \frac{1}{\sqrt{2}}\begin{bmatrix} d_1 \\ -jd_1 \end{bmatrix}, \\ \frac{1}{\sqrt{2}}\begin{bmatrix} d_2 \\ d_2 \end{bmatrix}, \frac{1}{\sqrt{2}}\begin{bmatrix} d_2 \\ -d_2 \end{bmatrix}, \frac{1}{\sqrt{2}}\begin{bmatrix} d_2 \\ jd_2 \end{bmatrix}, \frac{1}{\sqrt{2}}\begin{bmatrix} d_2 \\ -jd_2 \end{bmatrix}, \\ \frac{1}{\sqrt{2}}\begin{bmatrix} d_3 \\ d_3 \end{bmatrix}, \frac{1}{\sqrt{2}}\begin{bmatrix} d_3 \\ -d_3 \end{bmatrix}, \frac{1}{\sqrt{2}}\begin{bmatrix} d_3 \\ jd_3 \end{bmatrix}, \frac{1}{\sqrt{2}}\begin{bmatrix} d_3 \\ -jd_3 \end{bmatrix} \end{array}\right\} \quad (5A.2)$$

This codebook can be described by examples in the following Tables 7A.1 and 7A.2. The mappings between index $i_2$ and precoding vector V in Table 7A.1 and Table 7A.2 are exemplary.

TABLE 7A.1

| $i_2$ | V | Comment |
|---|---|---|
| 0 | $\frac{1}{\sqrt{2}}\begin{bmatrix} d_0 \\ \varphi_0 d_0 \end{bmatrix}$ | Select $1^{st}$ port (beam direction), cophase with +1 |
| 1 | $\frac{1}{\sqrt{2}}\begin{bmatrix} d_0 \\ \varphi_1 d_0 \end{bmatrix}$ | Select $1^{st}$ port (beam direction), cophase with +j |
| 2 | $\frac{1}{\sqrt{2}}\begin{bmatrix} d_0 \\ \varphi_2 d_0 \end{bmatrix}$ | Select $1^{st}$ port (beam direction), cophase with −1 |
| 3 | $\frac{1}{\sqrt{2}}\begin{bmatrix} d_0 \\ \varphi_3 d_0 \end{bmatrix}$ | Select $1^{st}$ port (beam direction), cophase with −j |
| 4 | $\frac{1}{\sqrt{2}}\begin{bmatrix} d_1 \\ \varphi_0 d_1 \end{bmatrix}$ | Select $2^{nd}$ port (beam direction), cophase with +1 |
| 5 | $\frac{1}{\sqrt{2}}\begin{bmatrix} d_1 \\ \varphi_1 d_1 \end{bmatrix}$ | Select $2^{nd}$ port (beam direction), cophase with +j |
| 6 | $\frac{1}{\sqrt{2}}\begin{bmatrix} d_1 \\ \varphi_2 d_1 \end{bmatrix}$ | Select $2^{nd}$ port (beam direction), cophase with −1 |
| 7 | $\frac{1}{\sqrt{2}}\begin{bmatrix} d_1 \\ \varphi_3 d_1 \end{bmatrix}$ | Select $2^{nd}$ port (beam direction), cophase with −j |
| 8 | $\frac{1}{\sqrt{2}}\begin{bmatrix} d_2 \\ \varphi_0 d_2 \end{bmatrix}$ | Select $3^{rd}$ port (beam direction), cophase with +1 |
| 9 | $\frac{1}{\sqrt{2}}\begin{bmatrix} d_2 \\ \varphi_1 d_2 \end{bmatrix}$ | Select $3^{rd}$ port (beam direction), cophase with +j |
| 10 | $\frac{1}{\sqrt{2}}\begin{bmatrix} d_2 \\ \varphi_2 d_2 \end{bmatrix}$ | Select $3^{rd}$ port (beam direction), cophase with −1 |
| 11 | $\frac{1}{\sqrt{2}}\begin{bmatrix} d_2 \\ \varphi_3 d_2 \end{bmatrix}$ | Select $3^{rd}$ port (beam direction), cophase with −j |
| 12 | $\frac{1}{\sqrt{2}}\begin{bmatrix} d_3 \\ \varphi_0 d_3 \end{bmatrix}$ | Select $4^{th}$ port (beam direction), cophase with +1 |
| 13 | $\frac{1}{\sqrt{2}}\begin{bmatrix} d_3 \\ \varphi_1 d_3 \end{bmatrix}$ | Select $4^{th}$ port (beam direction), cophase with +j |
| 14 | $\frac{1}{\sqrt{2}}\begin{bmatrix} d_3 \\ \varphi_2 d_3 \end{bmatrix}$ | Select $4^{th}$ port (beam direction), cophase with −1 |
| 15 | $\frac{1}{\sqrt{2}}\begin{bmatrix} d_3 \\ \varphi_3 d_3 \end{bmatrix}$ | Select $4^{th}$ port (beam direction), cophase with −j |

Note: $\varphi_k = e^{j\pi k/2}$

TABLE 7A.2

| $i_2$ | V | Comment |
|---|---|---|
| 0 | $\frac{1}{\sqrt{2}}\begin{bmatrix} d_0 \\ \varphi_0 d_0 \end{bmatrix}$ | Select $1^{st}$ port (beam direction), cophase with +1 |
| 1 | $\frac{1}{\sqrt{2}}\begin{bmatrix} d_0 \\ \varphi_2 d_0 \end{bmatrix}$ | Select $1^{st}$ port (beam direction), cophase with −1 |

TABLE 7A.2-continued

| $i_2$ | V | Comment |
|---|---|---|
| 2 | $\frac{1}{\sqrt{2}}\begin{bmatrix} d_0 \\ \varphi_1 d_0 \end{bmatrix}$ | Select $1^{st}$ port (beam direction), cophase with +j |
| 3 | $\frac{1}{\sqrt{2}}\begin{bmatrix} d_0 \\ \varphi_3 d_0 \end{bmatrix}$ | Select $1^{st}$ port (beam direction), cophase with −j |
| 4 | $\frac{1}{\sqrt{2}}\begin{bmatrix} d_1 \\ \varphi_0 d_1 \end{bmatrix}$ | Select $2^{nd}$ port (beam direction), cophase with +1 |
| 5 | $\frac{1}{\sqrt{2}}\begin{bmatrix} d_1 \\ \varphi_2 d_1 \end{bmatrix}$ | Select $2^{nd}$ port (beam direction), cophase with −1 |
| 6 | $\frac{1}{\sqrt{2}}\begin{bmatrix} d_1 \\ \varphi_1 d_1 \end{bmatrix}$ | Select $2^{nd}$ port (beam direction), cophase with +j |
| 7 | $\frac{1}{\sqrt{2}}\begin{bmatrix} d_1 \\ \varphi_3 d_1 \end{bmatrix}$ | Select $2^{nd}$ port (beam direction), cophase with −j |
| 8 | $\frac{1}{\sqrt{2}}\begin{bmatrix} d_2 \\ \varphi_0 d_2 \end{bmatrix}$ | Select $3^{rd}$ port (beam direction), cophase with +1 |
| 9 | $\frac{1}{\sqrt{2}}\begin{bmatrix} d_2 \\ \varphi_2 d_2 \end{bmatrix}$ | Select $3^{rd}$ port (beam direction), cophase with −1 |
| 10 | $\frac{1}{\sqrt{2}}\begin{bmatrix} d_2 \\ \varphi_1 d_2 \end{bmatrix}$ | Select $3^{rd}$ port (beam direction), cophase with +j |
| 11 | $\frac{1}{\sqrt{2}}\begin{bmatrix} d_2 \\ \varphi_3 d_2 \end{bmatrix}$ | Select $3^{rd}$ port (beam direction), cophase with −j |
| 12 | $\frac{1}{\sqrt{2}}\begin{bmatrix} d_3 \\ \varphi_0 d_3 \end{bmatrix}$ | Select $4^{th}$ port (beam direction), cophase with +1 |
| 13 | $\frac{1}{\sqrt{2}}\begin{bmatrix} d_3 \\ \varphi_2 d_3 \end{bmatrix}$ | Select $4^{th}$ port (beam direction), cophase with −1 |
| 14 | $\frac{1}{\sqrt{2}}\begin{bmatrix} d_3 \\ \varphi_1 d_3 \end{bmatrix}$ | Select $4^{th}$ port (beam direction), cophase with +j |
| 15 | $\frac{1}{\sqrt{2}}\begin{bmatrix} d_3 \\ \varphi_3 d_3 \end{bmatrix}$ | Select $4^{th}$ port (beam direction), cophase with −j |

Note:
$\varphi_k = e^{j\pi k/2}$

With $N_P=6$, and $N=4$ (such as QPSK scaling), the equation (5) is described as following equation (5B.1) (such as resulting in a size-12 codebook)

$$V \in \left\{ \frac{1}{\sqrt{2}}\begin{bmatrix} d_0 \\ \pm d_0 \end{bmatrix}, \frac{1}{\sqrt{2}}\begin{bmatrix} d_1 \\ \pm d_1 \end{bmatrix}, \frac{1}{\sqrt{2}}\begin{bmatrix} d_2 \\ \pm d_2 \end{bmatrix}, \right. \\ \left. \frac{1}{\sqrt{2}}\begin{bmatrix} d_0 \\ \pm j d_0 \end{bmatrix}, \frac{1}{\sqrt{2}}\begin{bmatrix} d_1 \\ \pm j d_1 \end{bmatrix}, \frac{1}{\sqrt{2}}\begin{bmatrix} d_2 \\ \pm j d_2 \end{bmatrix} \right\} \quad (5B.1)$$

where $d_n$ is a length-3 vector with all zeros except at the n-th position (n=0, 1, 2). For instance, $$d_1 = \begin{bmatrix} 0 \\ 1 \\ 0 \end{bmatrix}.$$

In one example, the equation (5B.1) is equivalently described as following equation (5B.2):

$$V \in \left\{ \begin{array}{l} \frac{1}{\sqrt{2}}\begin{bmatrix} d_0 \\ d_0 \end{bmatrix}, \frac{1}{\sqrt{2}}\begin{bmatrix} d_0 \\ -d_0 \end{bmatrix}, \frac{1}{\sqrt{2}}\begin{bmatrix} d_0 \\ jd_0 \end{bmatrix}, \frac{1}{\sqrt{2}}\begin{bmatrix} d_0 \\ -jd_0 \end{bmatrix}, \\ \frac{1}{\sqrt{2}}\begin{bmatrix} d_1 \\ d_1 \end{bmatrix}, \frac{1}{\sqrt{2}}\begin{bmatrix} d_1 \\ -d_1 \end{bmatrix}, \frac{1}{\sqrt{2}}\begin{bmatrix} d_1 \\ jd_1 \end{bmatrix}, \frac{1}{\sqrt{2}}\begin{bmatrix} d_1 \\ -jd_1 \end{bmatrix}, \\ \frac{1}{\sqrt{2}}\begin{bmatrix} d_2 \\ d_2 \end{bmatrix}, \frac{1}{\sqrt{2}}\begin{bmatrix} d_2 \\ -d_2 \end{bmatrix}, \frac{1}{\sqrt{2}}\begin{bmatrix} d_2 \\ jd_2 \end{bmatrix}, \frac{1}{\sqrt{2}}\begin{bmatrix} d_2 \\ -jd_2 \end{bmatrix} \end{array} \right\} \quad (5B.2)$$

This codebook can be described by examples in the following Tables 7B.1 and 7B.2. The mappings between index $i_2$ and precoding vector V in Table B.1 and Table B.2 are exemplary.

TABLE 7B.1

| $i_2$ | V | Comment |
|---|---|---|
| 0 | $\frac{1}{\sqrt{2}}\begin{bmatrix} d_0 \\ \varphi_0 d_0 \end{bmatrix}$ | Select $1^{st}$ port (beam direction), cophase with +1 |
| 1 | $\frac{1}{\sqrt{2}}\begin{bmatrix} d_0 \\ \varphi_1 d_0 \end{bmatrix}$ | Select $1^{st}$ port (beam direction), cophase with +j |
| 2 | $\frac{1}{\sqrt{2}}\begin{bmatrix} d_0 \\ \varphi_2 d_0 \end{bmatrix}$ | Select $1^{st}$ port (beam direction), cophase with −1 |
| 3 | $\frac{1}{\sqrt{2}}\begin{bmatrix} d_0 \\ \varphi_3 d_0 \end{bmatrix}$ | Select $1^{st}$ port (beam direction), cophase with −j |
| 4 | $\frac{1}{\sqrt{2}}\begin{bmatrix} d_1 \\ \varphi_0 d_1 \end{bmatrix}$ | Select $2^{nd}$ port (beam direction), cophase with +1 |
| 5 | $\frac{1}{\sqrt{2}}\begin{bmatrix} d_1 \\ \varphi_1 d_1 \end{bmatrix}$ | Select $2^{nd}$ port (beam direction), cophase with +j |
| 6 | $\frac{1}{\sqrt{2}}\begin{bmatrix} d_1 \\ \varphi_2 d_1 \end{bmatrix}$ | Select $2^{nd}$ port (beam direction), cophase with −1 |
| 7 | $\frac{1}{\sqrt{2}}\begin{bmatrix} d_1 \\ \varphi_3 d_1 \end{bmatrix}$ | Select $2^{nd}$ port (beam direction), cophase with −j |
| 8 | $\frac{1}{\sqrt{2}}\begin{bmatrix} d_2 \\ \varphi_0 d_2 \end{bmatrix}$ | Select $3^{rd}$ port (beam direction), cophase with +1 |
| 9 | $\frac{1}{\sqrt{2}}\begin{bmatrix} d_2 \\ \varphi_1 d_2 \end{bmatrix}$ | Select $3^{rd}$ port (beam direction), cophase with +j |
| 10 | $\frac{1}{\sqrt{2}}\begin{bmatrix} d_2 \\ \varphi_2 d_2 \end{bmatrix}$ | Select $3^{rd}$ port (beam direction), cophase with −1 |
| 11 | $\frac{1}{\sqrt{2}}\begin{bmatrix} d_2 \\ \varphi_3 d_2 \end{bmatrix}$ | Select $3^{rd}$ port (beam direction), cophase with −j |

Note:
$\varphi_k = e^{j\pi k/2}$

TABLE 7B.2

| $i_2$ | V | Comment |
|---|---|---|
| 0 | $\frac{1}{\sqrt{2}}\begin{bmatrix} d_0 \\ \varphi_0 d_0 \end{bmatrix}$ | Select $1^{st}$ port (beam direction), cophase with +1 |
| 1 | $\frac{1}{\sqrt{2}}\begin{bmatrix} d_0 \\ \varphi_2 d_0 \end{bmatrix}$ | Select $1^{st}$ port (beam direction), cophase with −1 |
| 2 | $\frac{1}{\sqrt{2}}\begin{bmatrix} d_0 \\ \varphi_1 d_0 \end{bmatrix}$ | Select $1^{st}$ port (beam direction), cophase with +j |
| 3 | $\frac{1}{\sqrt{2}}\begin{bmatrix} d_0 \\ \varphi_3 d_0 \end{bmatrix}$ | Select $1^{st}$ port (beam direction), cophase with −j |
| 4 | $\frac{1}{\sqrt{2}}\begin{bmatrix} d_1 \\ \varphi_0 d_1 \end{bmatrix}$ | Select $2^{nd}$ port (beam direction), cophase with +1 |
| 5 | $\frac{1}{\sqrt{2}}\begin{bmatrix} d_1 \\ \varphi_2 d_1 \end{bmatrix}$ | Select $2^{nd}$ port (beam direction), cophase with −1 |
| 6 | $\frac{1}{\sqrt{2}}\begin{bmatrix} d_1 \\ \varphi_1 d_1 \end{bmatrix}$ | Select $2^{nd}$ port (beam direction), cophase with +j |
| 7 | $\frac{1}{\sqrt{2}}\begin{bmatrix} d_1 \\ \varphi_3 d_1 \end{bmatrix}$ | Select $2^{nd}$ port (beam direction), cophase with −j |
| 8 | $\frac{1}{\sqrt{2}}\begin{bmatrix} d_2 \\ \varphi_0 d_2 \end{bmatrix}$ | Select $3^{rd}$ port (beam direction), cophase with +1 |
| 9 | $\frac{1}{\sqrt{2}}\begin{bmatrix} d_2 \\ \varphi_2 d_2 \end{bmatrix}$ | Select $3^{rd}$ port (beam direction), cophase with −1 |
| 10 | $\frac{1}{\sqrt{2}}\begin{bmatrix} d_2 \\ \varphi_1 d_2 \end{bmatrix}$ | Select $3^{rd}$ port (beam direction), cophase with +j |
| 11 | $\frac{1}{\sqrt{2}}\begin{bmatrix} d_2 \\ \varphi_3 d_2 \end{bmatrix}$ | Select $3^{rd}$ port (beam direction), cophase with −j |

Note:
$\varphi_k = e^{j\pi k/2}$

With $N_P=4$, and $N=4$ (such as QPSK scaling), the equation (5) is described as following equation (5C.1) (such as resulting in a size-8 codebook)

$$V \in \left\{ \frac{1}{\sqrt{2}}\begin{bmatrix} d_0 \\ \pm d_0 \end{bmatrix}, \frac{1}{\sqrt{2}}\begin{bmatrix} d_1 \\ \pm d_1 \end{bmatrix}, \frac{1}{\sqrt{2}}\begin{bmatrix} d_0 \\ \pm j d_0 \end{bmatrix}, \frac{1}{\sqrt{2}}\begin{bmatrix} d_1 \\ \pm j d_1 \end{bmatrix} \right\} \quad (5C.1)$$

where $d_n$ is a length-2 vector with all zeros except at the n-th position (n=0, 1). For instance, $$d_1 = \begin{bmatrix} 0 \\ 1 \end{bmatrix}.$$

In one example, the equation (5C.1) is equivalently described as following equation (5C.2):

$$V \in \left\{ \frac{1}{\sqrt{2}}\begin{bmatrix} d_0 \\ d_0 \end{bmatrix}, \frac{1}{\sqrt{2}}\begin{bmatrix} d_0 \\ -d_0 \end{bmatrix}, \frac{1}{\sqrt{2}}\begin{bmatrix} d_0 \\ j d_0 \end{bmatrix}, \frac{1}{\sqrt{2}}\begin{bmatrix} d_0 \\ -j d_0 \end{bmatrix}, \right. \\ \left. \frac{1}{\sqrt{2}}\begin{bmatrix} d_1 \\ d_1 \end{bmatrix}, \frac{1}{\sqrt{2}}\begin{bmatrix} d_1 \\ -d_1 \end{bmatrix}, \frac{1}{\sqrt{2}}\begin{bmatrix} d_1 \\ j d_1 \end{bmatrix}, \frac{1}{\sqrt{2}}\begin{bmatrix} d_1 \\ -j d_1 \end{bmatrix} \right\} \quad (5C.2)$$

This codebook can be described by examples in the following Tables 7C.1 and 7C.2. The mappings between index $i_2$ and precoding vector V in Table 7C.1 and Table 7C.2 are exemplary.

TABLE 7C.1

| $i_2$ | V | Comment |
|---|---|---|
| 0 | $\frac{1}{\sqrt{2}}\begin{bmatrix} d_0 \\ \varphi_0 d_0 \end{bmatrix}$ | Select $1^{st}$ port (beam direction), cophase with +1 |
| 1 | $\frac{1}{\sqrt{2}}\begin{bmatrix} d_0 \\ \varphi_1 d_0 \end{bmatrix}$ | Select $1^{st}$ port (beam direction), cophase with +j |
| 2 | $\frac{1}{\sqrt{2}}\begin{bmatrix} d_0 \\ \varphi_2 d_0 \end{bmatrix}$ | Select $1^{st}$ port (beam direction), cophase with −1 |
| 3 | $\frac{1}{\sqrt{2}}\begin{bmatrix} d_0 \\ \varphi_3 d_0 \end{bmatrix}$ | Select $1^{st}$ port (beam direction), cophase with −j |
| 4 | $\frac{1}{\sqrt{2}}\begin{bmatrix} d_1 \\ \varphi_0 d_1 \end{bmatrix}$ | Select $2^{nd}$ port (beam direction), cophase with +1 |
| 5 | $\frac{1}{\sqrt{2}}\begin{bmatrix} d_1 \\ \varphi_1 d_1 \end{bmatrix}$ | Select $2^{nd}$ port (beam direction), cophase with +j |
| 6 | $\frac{1}{\sqrt{2}}\begin{bmatrix} d_1 \\ \varphi_2 d_1 \end{bmatrix}$ | Select $2^{nd}$ port (beam direction), cophase with −1 |
| 7 | $\frac{1}{\sqrt{2}}\begin{bmatrix} d_1 \\ \varphi_3 d_1 \end{bmatrix}$ | Select $2^{nd}$ port (beam direction), cophase with −j |

Note:
$\varphi_k = e^{j\pi k/2}$

TABLE 7C.2

| $i_2$ | V | Comment |
|---|---|---|
| 0 | $\frac{1}{\sqrt{2}}\begin{bmatrix} d_0 \\ \varphi_0 d_0 \end{bmatrix}$ | Select $1^{st}$ port (beam direction), cophase with +1 |
| 1 | $\frac{1}{\sqrt{2}}\begin{bmatrix} d_0 \\ \varphi_2 d_0 \end{bmatrix}$ | Select $1^{st}$ port (beam direction), cophase with −1 |
| 2 | $\frac{1}{\sqrt{2}}\begin{bmatrix} d_0 \\ \varphi_1 d_0 \end{bmatrix}$ | Select $1^{st}$ port (beam direction), cophase with +j |
| 3 | $\frac{1}{\sqrt{2}}\begin{bmatrix} d_0 \\ \varphi_3 d_0 \end{bmatrix}$ | Select $1^{st}$ port (beam direction), cophase with −j |
| 4 | $\frac{1}{\sqrt{2}}\begin{bmatrix} d_1 \\ \varphi_0 d_1 \end{bmatrix}$ | Select $2^{nd}$ port (beam direction), cophase with +1 |
| 5 | $\frac{1}{\sqrt{2}}\begin{bmatrix} d_1 \\ \varphi_2 d_1 \end{bmatrix}$ | Select $2^{nd}$ port (beam direction), cophase with −1 |

TABLE 7C.2-continued

| $i_2$ | V | Comment |
|---|---|---|
| 6 | $\frac{1}{\sqrt{2}}\begin{bmatrix} d_1 \\ \varphi_1 d_1 \end{bmatrix}$ | Select $2^{nd}$ port (beam direction), cophase with +j |
| 7 | $\frac{1}{\sqrt{2}}\begin{bmatrix} d_1 \\ \varphi_3 d_1 \end{bmatrix}$ | Select $2^{nd}$ port (beam direction), cophase with −j |

Note:
$\varphi_k = e^{j\pi k/2}$

With $N_P=2$ (such as only one beam direction) and N=4 (such as QPSK scaling), the equation (5) is described as following equation (5D.1) (such as resulting in a size-4 codebook)

$$V \in \left\{ \frac{1}{\sqrt{2}}\begin{bmatrix} 1 \\ \pm 1 \end{bmatrix}, \frac{1}{\sqrt{2}}\begin{bmatrix} 1 \\ \pm j \end{bmatrix} \right\} \quad (5D.1)$$

In one example, the equation (5D.1) is equivalently described as following equation (5D.2):

$$V \in \left\{ \frac{1}{\sqrt{2}}\begin{bmatrix} 1 \\ 1 \end{bmatrix}, \frac{1}{\sqrt{2}}\begin{bmatrix} 1 \\ -1 \end{bmatrix}, \frac{1}{\sqrt{2}}\begin{bmatrix} 1 \\ j \end{bmatrix}, \frac{1}{\sqrt{2}}\begin{bmatrix} 1 \\ -j \end{bmatrix} \right\} \quad (5D.2)$$

This codebook can be described by examples in the following Tables 7D.1 and 7D.2. The mappings between index $i_2$ and precoding vector V in Table 7D.1 and Table 7D.2 are exemplary.

TABLE 7D.1

| $i_2$ | V | Comment |
|---|---|---|
| 0 | $\frac{1}{\sqrt{2}}\begin{bmatrix} 1 \\ \varphi_0 \end{bmatrix}$ | Cophase with +1 |
| 1 | $\frac{1}{\sqrt{2}}\begin{bmatrix} 1 \\ \varphi_1 \end{bmatrix}$ | Cophase with +j |
| 2 | $\frac{1}{\sqrt{2}}\begin{bmatrix} 1 \\ \varphi_2 \end{bmatrix}$ | Cophase with −1 |
| 3 | $\frac{1}{\sqrt{2}}\begin{bmatrix} 1 \\ \varphi_3 \end{bmatrix}$ | Cophase with −j |

Note:
$\varphi_k = e^{j\pi k/2}$

TABLE 7D.2

| $i_2$ | V | Comment |
|---|---|---|
| 0 | $\frac{1}{\sqrt{2}}\begin{bmatrix} 1 \\ \varphi_0 \end{bmatrix}$ | Cophase with +1 |
| 1 | $\frac{1}{\sqrt{2}}\begin{bmatrix} 1 \\ \varphi_2 \end{bmatrix}$ | Cophase with −1 |
| 2 | $\frac{1}{\sqrt{2}}\begin{bmatrix} 1 \\ \varphi_1 \end{bmatrix}$ | Cophase with +j |

TABLE 7D.2-continued

| $i_2$ | V | Comment |
|---|---|---|
| 3 | $\frac{1}{\sqrt{2}}\begin{bmatrix} 1 \\ \varphi_3 \end{bmatrix}$ | Cophase with −j |

Note:
$\varphi_k = e^{j\pi k/2}$

A codebook that produces the same effect as the equation (5A)-(5D) are obtained from Table 1 by fixing a value of $i_1$ (such as to 0), altering $v_m$ to a length-$N_P/2$ vector where $$[v_m]_k = \begin{cases} 2, k = m \\ 0, k \neq m' \end{cases}$$

and assigning $i_2$ as the PMI for V. The index k denotes the k-th element of $v_m$ (k=0, 1, ..., $N_P/2-1$). Furthermore, m and n are related to $i_2$ as follows:

$$m = \left\lfloor \frac{i_2}{4} \right\rfloor,$$

n=mod($i_2$, 4).

In some embodiments (such as scenario B), a feeding back of $W_L$ is needed in addition to V. In such embodiments, a full PMI reporting is performed when a UE receives or is configured with a non-precoded CSI-RS at a particular instance (such as subframe). In such embodiments, a full PMI reporting is performed when a UE is configured with a CSI reporting type or mode that is specified with this full PMI reporting. In this situation, in addition to CQI and RI, four PMI fields associated with the following precoder components are needed (cf. (2)): $\{W_{L,v}, W_{L,h}, V_v, V_h\}$, that is denoted as $\{i_{1,v}, i_{1,h}, i_{2,v}, i_{2,h}\}$ or $\{i_{1,1}, i_{1,2}, i_{2,1}, i_{2,2}\}$, respectively. In one example, three PMI fields associated with the following precoder components are used: $\{W_{L,v}, W_{L,h}, V\}$ that is denoted as $\{i_{1,v}, i_{1,h}, i_2\}$ or $\{i_{1,1}, i_{1,2}, i_2\}$, respectively.

Figure 6:
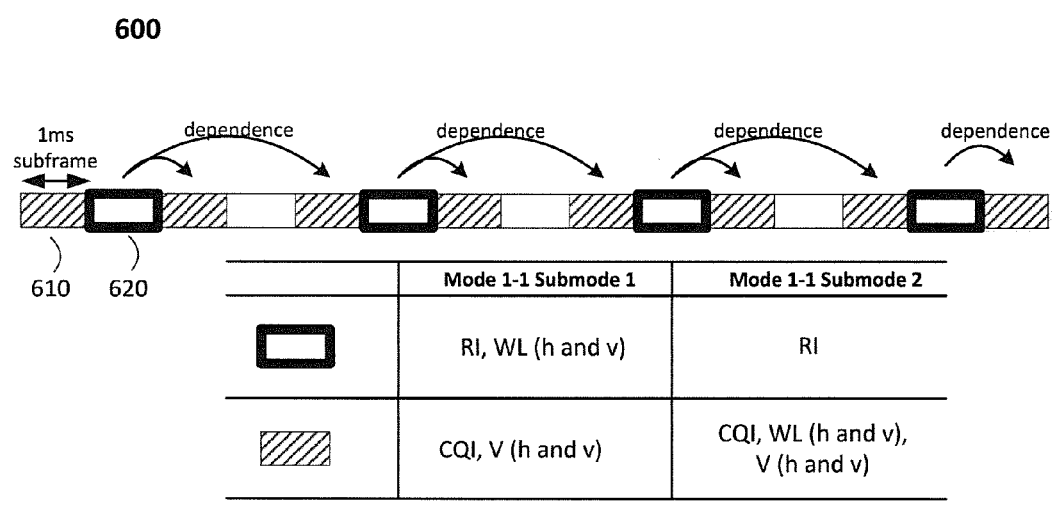
FIG. 6 illustrates an example of a CSI processing scheme to report a PMI component according to the present disclosure.

FIG. 6 illustrates an example of a channel status indication (CSI) processing scheme to report a precoding matrix indicator (PMI) component according to the present disclosure. The embodiment of the CSI processing scheme 600 illustrated in FIG. 6 is for illustration only. Other embodiments of the CSI processing scheme 600 could be used without departing from the scope of this disclosure.

As illustrated in FIG. 6, the CSI processing scheme 600 comprises a plurality of subframes 610, 620, each of which has 1 ms long, that are sequentially transmitted in a transmission channel. When a subframe 610 is used for a mode 1-1 submode 1, the subframe 610 carries a CQI and V (such as h and v). When the subframe 610 is used for a mode 1-1 submode 2, the subframe 610 carries a CQI, WL (such as h and v), and V (h and v). In addition, when a subframe 620 is used for the mode 1-1 submode 1, the subframe 620 carries an RI, WL (h and v). When the subframe 620 is used for the mode 1-1 submode 2, the subframe 620 carries an RI only.

As illustrated in FIG. 6, one CSI process is used to report both long-term and short-term PMI components via the same CSI reporting mode. More specifically, an RI (and consequently $W_L$ in submode 1) is less frequently reported about 2 times compared to CQI. As illustrated in FIG. 6, the reporting periodicity of 2 subframes is also assumed for illustrative purposes.

In one embodiment, one CSI process for a PMI reporting associated with both $W_L$ and V is performed. In another embodiment, a feedback of PMIs associated with the two precoders is performed concurrently within one CSI reporting mode. In one example, a P-CSI mode 1-1 submode 1 is used to report at least one PMI associated with $W_L$ jointly with an RI within the same set of subframes, along with CQI and PMI for V on different subframes (such as illustrated in FIG. 6). In such example, a recommended V is conditioned upon the most recent recommendation of $W_L$ and RI prior to the V. An eNB reconstructs the recommendation of each UE when PMI feedback in vertical dimension is based on a single-stage long-term precoding, V (such as associated PMI) includes only horizontal component. In another example, a P-CSI mode 1-1 submode 2 is used to report at least one PMI associated with $W_L$ jointly with CQI, PMI, and V within the same set of subframes, along with RI on different subframes (such as illustrated in FIG. 6). In such example, recommended $W_L$ and V are conditioned upon the most recent recommendation of RI prior to the $W_L$ and V. An eNB reconstructs the recommendation of each UE when PMI feedback in vertical dimension is based on a single-stage long-term precoding, V (such as associated PMI) includes only horizontal component.

In yet another example, a P-CSI (PUCCH) mode 1-1 that is illustrated in FIG. 6 is performed with both submode 1 and 2. As illustrated in FIG. 600, an RI, a CQI, and a PMI reports are multiplexed. In one example of submode 1, the subframe 620 carries the RI and at least one PMI associated with $W_L$ ($\{i_{1,v}, i_{1,h}\}$ or $\{i_{1,1}, i_{1,2}\}$) whereas the subframe 610 carries the CQI together with at least one PMI associated with V ($\{i_{2,v}, i_{2,h}\}$ or $\{i_{2,1}, i_{2,2}\}$ or $\{i_2\}$). In another example of submode 2, the subframe 620 carries an RI whereas the subframe 610 carries a CQI together with at least one PMI associated with $W_L$ and V ($\{i_{1,v}, i_{1,h}, i_{2,v}, i_{2,h}\}$ or $\{i_{1,1}, i_{1,2}, i_{2,1}, i_{2,2}\}$ or $\{i_{1,1}, i_{1,2}, i_2\}$. A UE calculates the RI, the CQI, and the PMI in such a way that the calculation in the subframe 610 depends on that in the subframe 620.

In yet another example, A-CSI mode 1-2, 2-2, 3-1, or 3-2 is used to report PMIs associated with $W_L$ and V together, along with CQI and RI. In yet another example, at least one corresponding CQI is calculated assuming the use of the precoding matrix (such as matrices) corresponding to $\{i_{1,v}, i_{1,h}, i_{2,v}, i_{2,h}\}$ or $\{i_{1,1}, i_{1,2}, i_{2,1}, i_{2,2}\}$ or $\{i_{1,1}, i_{1,2}, i_2\}$. For submode 1, $\{i_{1,v}, i_{1,h}\}$ or $\{i_{1,1}, i_{1,2}\}$ come from the most recently reported values. Depending on a CSI reporting mode, each of the PMI values (such as precoding matrices) is wideband (such as assuming a transmission on set S subbands) or subband (such as assuming a transmission only in the subband). The reported PMI and CQI values are calculated based on a condition of the reported RI.

In yet another example, a codebook subset restriction or codebook subsampling is applied to at least one of PMI components ($\{i_{1,v}, i_{1,h}, i_{2,v}, i_{2,h}\}$ or $\{i_{1,1}, i_{1,2}, i_{2,1}, i_{2,2}\}$ or $\{i_{1,1}, i_{1,2}, i_2\}$) to reduce a number of precoder hypotheses associated with the PMI component(s). In such example, a feedback payload (such as a number of bits required or used to represent a precoder hypothesis) is determined based on a chosen codebook subset (or subsampled codebook) rather than a full codebook. In yet another example, in addition to PUCCH format 2/2a/2b, PUCCH format 3 (such as up to 22-bit payload) is utilized to report PMI. When PUCCH format 3 is utilized, all the CSI reporting parameters ({CQI, RI, $i_{1,v}$, $i_{1,h}$} or {CQI, RI, $i_{1,1}$, $i_{1,2}$} or {CQI, RI, $i_2$}) are included in one reporting instance, all within one subframe. Furthermore, another PUCCH format (such as a new PUCCH format) that supports a higher maximum payload is used.

Figure 7:
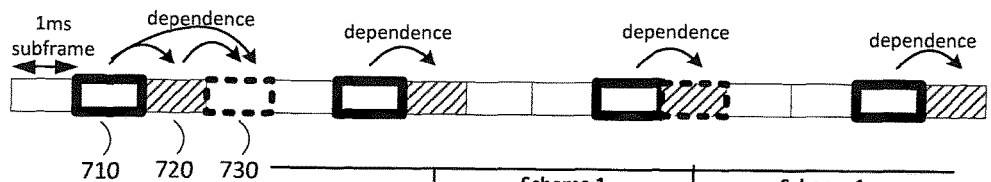
FIG. 7 illustrates another example of a CSI processing scheme to report a PMI component according to the present disclosure.

FIG. 7 illustrates another example of a CSI processing scheme 700 to report a PMI component according to the present disclosure. The embodiment of the CSI processing scheme 700 shown in FIG. 7 is for illustration only. Other embodiments of the CSI processing scheme 700 could be used without departing from the scope of this disclosure.

As illustrated in FIG. 7, the CSI processing scheme 700 comprises a plurality of subframes, 710, 720, 730 each of which has 1 ms long that are sequentially transmitted in a transmission channel. When the subframe 710 is used for a scheme 1 of P-CSI mode 1-1 submode 1, the subframe 710 carries an RI, a wideband WL (such as h and v). When the subframe 710 is used for a scheme 1 of P-CSI mode 1-1 submode 2, the subframe 710 carries an RI. When the subframe 720 is used for the scheme 1 of P-CSI mode 1-1 submode 1, the subframe 720 carries a wideband CQI. When the subframe 720 is used for the scheme 1 of mode 1-1 submode 2, the subframe 720 carries a wideband CQI and a wideband WL (such as h and v). When the subframe 730 is used for the scheme 1 of P-CSI mode 101 submode 1 and the scheme 2 of P-CSI mode -1 submode 2, the subframe 730 carries an A-CSI (such as subband CQI, subband V including h and v).

When the subframe 710 is used for a scheme 2 of P-CSI mode 1-1 submode 1, the subframe 710 carries an RI, a wideband WL (such as h and v). When the subframe 710 is used for the scheme 2 of P-CSI mode 1-1 submode 2, the subframe 710 carries an RI. When the subframe 720 is used for the scheme 2 of P-CSI mode 1-1 submode 1, the subframe 720 carries a wideband CQI. When the subframe 720 is used for the scheme 2 of mode 1-1 submode 2, the subframe 720 carries a wideband CQI and a wideband WL (such as h and v). When the subframe 730 is used for the scheme 2 of P-CSI mode 101 submode 1 and the scheme 2 of P-CSI mode -1 submode 2, the subframe 730 carries an A-CSI (such as subband CQI, wideband WL including h and v).

In some embodiments, a feedback of two precoders is performed via two different CSI reporting modes (such as P-CSI mode and A-CSI mode) within the same CSI process. Therefore, a linkage (such as timing association) between the P-CSI and the A-CSI may be required or used.

In one embodiment, a UE (such as UE-k) is configured with a P-CSI mode 1-1 (such as an RI, a wideband CQI and PMI) and an A-CSI mode 3-2 (such as an RI, a subband CQI and PMI). The UE behavior (such as a CQI and PMI definition) is defined in such a way that CSI computations for those two modes are jointly performed jointly (or at least, one is conditioned upon the other). In one example, a mode 1-1 P-CSI is used to report a long-term wideband PMI (such as corresponding to $W_L$ that is $\{i_{1,v}, i_{1,h}\}$ or $\{i_{1,1}, i_{1,2}\}$) whereas a mode 3-1 or 3-2 A-CSI short-term (such as a wideband or a subband, respectively) PMIs (such as corresponding to V that is $\{i_{2,v}, i_{2,h}\}$ or $\{i_{2,1}, i_{2,2}\}$ or $\{i_2\}$). In this case, what is being reported in the A-CSI depends on the P-CSI or the P-CSI depends on the A-CSI.

In another embodiment, a UE (such as UE-k) is configured with a P-CSI mode to report at least one PMI associated with V, while an A-CSI mode is configured to report at least one PMI associated with $W_L$. Since $W_L$ is typically a long-term and wideband. In one example, an A-CSI mode in this case is a mode 3-1 and an associated P-CSI mode is a P-CSI mode 1-1 or 2-1. In yet another embodiment, in either of the two aforementioned embodiments, a UE recommendation of V is conditioned upon the most recent recommendation of $W_L$ and RI prior to or concurrent with V.

The aforementioned embodiments are illustrated in FIG. 7 where three types of CSI reporting subframes (such as 710, 720, and 730) are present. In such embodiments, a P-CSI and an A-CSI are overlapped within one subframe. When the P-CSI and the A-CSI are overlapped, several alternatives are offered, but these alternatives are not mutually exclusive and used to complement each other. In one example, the content of the P-CSI and the A-CSI are combined into an A-CSI report transmitted via PUSCH (such as the scheme 1 illustrated in FIG. 7). In another example, if a UE of interest is configured with concurrent PUCCH-PUSCH operation, the P-CSI is transmitted via the PUCCH and the A-CSI via the PUSCH from the UE (such as the scheme 2 illustrated in FIG. 7). In yet another example, one of the reports (such as either a P-CSI or an A-CSI) is dropped based on a predetermined prioritization rule.

In yet another embodiment, at least one corresponding CQI is calculated assuming the use of a precoding matrix (such as matrices) corresponding to $\{i_{1,v}, i_{1,h}, i_{2,v}, i_{2,h}\}$ or $\{i_{1,1}, i_{1,2}, i_{2,1}, i_{2,2}\}$ or $\{i_{1,1}, i_{1,2}, i_2\}$. For PUCCH mode 1-1 submode 1, $\{i_{1,v}, i_{1,h}\}$ or $\{i_{1,1}, i_{1,2}\}$ come from the most recently reported values. Depending on a CSI reporting mode, each of PMI values (such as precoding matrices) is a wideband assuming a transmission on a set S subbands or a subband assuming a transmission only in a subband. In this situation, a reported PMI and CQI values are conditionally calculated based on the reported RI.

In the aforementioned embodiments, a codebook subset restriction or codebook subsampling is applied to at least one of PMI components ($\{i_{1,v}, i_{1,h}, i_{2,v}, i_{2,h}\}$, $\{i_{1,1}, i_{1,2}, i_{2,1}, i_{2,2}\}$, or $\{i_{1,1}, i_{1,2}, i_2\}$) to reduce a number of precoder hypotheses associated with the PMI components. In addition, a feedback payload (such as a number of bits required or used to represent a precoder hypothesis) is determined based on a chosen codebook subset or subsampled codebook rather than a full codebook.

As illustrated in FIG. 7, one CSI process is used to report both long-term and short-term PMI components via the same CSI reporting mode. In this situation, an RI (such as consequently $W_L$ in the submode 1) is reported at a frequency as a CQI. A reporting periodicity of 2 subframes is also assumed for illustrative purposes. In one embodiment, separate CSI processes are performed for both $W_L$ and V feedbacks. In such embodiments, each of two CSI modes is associated with a distinct CSI process (such as instead of the same CSI process). However, the separate CSI processes provide more flexibility to turn on and off, or use only one type of CSI feedback (such as either $W_L$ or V). In one example, a reporting at least one PMI associated with $W_L$ is wasteful since PMI associated with $W_L$ is not needed.

In some embodiments, a scheme that supports a precoding scheme described in the equation (1) and is able to switch PMI reporting for $W_L$ on and off is needed (such as scenario C). In such embodiment, $W_L$ and V are perceived as more separated than LTE specification (such as W1 and W2 that are represented as i1 and i2, respectively) in terms of CSI reporting that leads to more demarcation than what is defined in TE specification.

In one embodiment, an implicit switching between the aforementioned embodiments, (such as scenario A and scenario B) is performed in response to a type of CSI-RS received and measured by a UE in each CSI-RS-carrying subframe. In one example, a serving eNB configures a UE for receiving and measuring non-precoded (NP) CSI-RS or a first CSI-RS in a first set of subframes, and beamformed (BF) CSI-RS or a second CSI-RS in a second set of subframes. The eNB informs the UE of this configuration via a higher-layer (such as RRC) signaling as a part of CSI-RS resource configuration. Upon receiving and measuring the first set of subframes, the UE reports at least one PMI value for $W_L$ ($\{i_{1,v}, i_{1,h}, i_{2,v}, i_{2,h}\}$, $\{i_{1,1}, i_{1,2}, i_{2,1}, i_{2,2}\}$, or $\{i_{1,1}, i_{1,2}, i_2\}$) together with the corresponding RI and CQI values. Upon receiving and measuring the second set of subframes, the UE reports at least one PMI value for V ($\{i_{2,v}, i_{2,h}\}$, $\{i_{2,1}, i_{2,2}\}$, or $\{i_2\}$) together with the corresponding RI and CQI values. In another example, a serving eNB configures a UE with a first CSI reporting type or mode for a first set of subframes and a second CSI reporting type, or mode for a second set of subframes.

In such embodiment, at least one corresponding CQI is calculated assuming the use of the precoding matrix (such as matrices) corresponding to a calculated and reported PMI values. For PUCCH mode 1-1 submode 1, $\{i_{1,v}, i_{1,h}\}$ or $\{i_{1,1}, i_{1,2}\}$ come from the most recently reported values. Depending on a CSI reporting mode, each of the PMI values (such as precoding matrices) is a wideband assuming transmission on set S subbands or subband assuming transmission only in the subband. The reported PMI and CQI values are conditionally calculated based on the reported RI. In addition to, a codebook subset restriction or a codebook subsampling is applied to at least one of the PMI components to reduce a number of precoder hypotheses associated with the PMI components. A feedback payload (such as a number of bits required or used to represent a precoder hypothesis) is determined based on a chosen codebook subset or subsampled codebook rather than a full codebook.

Figure 8:
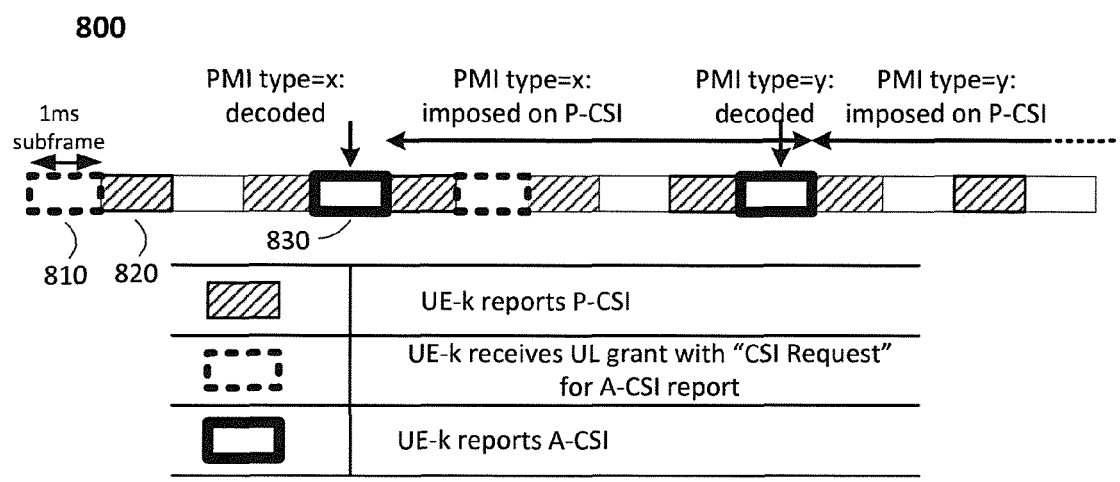
FIG. 8 illustrates another example of a CSI processing scheme to report a PMI component according to the present disclosure.

FIG. 8 illustrates another example of a CSI processing scheme to report a PMI component according to the present disclosure. The embodiment of the CSI processing scheme 800 shown in FIG. 8 is for illustration only. Other embodiments of the CSI processing scheme 800 could be used without departing from the scope of this disclosure. As illustrated in FIG. 8, the CSI processing scheme 800 comprises a plurality of subframes, 810, 820, 830 each of which has 1 ms long that are sequentially transmitted in a transmission channel. At the subframe 810, a UE-k receives an UL grant with a CSI Request for an A-CSI report. At the subframe 820, the UE-k reports a P-CSI to an eNB. And then, at the subframe 830, the UE-k reports an A-CSI to the eNB.

In some embodiments, a dynamic switching (such as on and off) of PMI reporting for $W_L$ is performed. To enable the dynamic switching, a new field or parameter (such as PMI type or precoding type) is defined to differentiate $W_L$ (such as long-term or longer-term) from V (such as a short-term or a shorter-term). The defined PMI type or Precoding type are included in a configured DCI format (such as for UL grant that is associated with an UL transmission mode and used by an eNB to trigger an A-CSI report from a UE-k). In one example, a DCI format 0B in LTE is derived from a format 0 by incorporating the PMI type. Similarly, a format 4B in LTE is derived from a format 4 accordingly. These new parameters are independently defined or as a part of a CSI request field is an RRC signaling. If the PMI type is made a part of the CSI Request, at least one additional bit is needed if this feature is to be supported in conjunction with a cell aggregation and multiple CSI processes.

For a given CSI process, some precoding schemes are defined as following: 1) $W_L$ (such as a long-term) only corresponding to $\{i_{1,v}, i_{1,h}\}$ or $\{i_{1,1}, i_{1,2}\}$, 2) V (such as a short-term) only corresponding to $\{i_{2,v}, i_{2,h}\}$ or $\{i_{2,1}, i_{2,2}\}$ or {$i_2$} and 3) both $W_L$ and V corresponding to {$i_{1,v}$, $i_{1,h}$, $i_{2,v}$, $i_{2,h}$} or {$i_{1,1}$, $i_{1,2}$, $i_{2,1}$, $i_{2,2}$} or {$i_{1,1}$, $i_{1,2}$, $i_2$}. For example, $W_L$ (such as a long-term) only entails a semi-closed-loop transmission while V (such as a short-term) only allows an eNB to utilize an UL-DL long-term reciprocity thereby saving the overhead associated with $W_L$ feedback. Other possible schemes include a subset selection within a codebook for $W_L$ and/or the codebook for V. These schemes are included either as a separate DCI field from a PMI type or jointly encoded with at least the PMI type.

The aforementioned embodiment is applicable to an A-CSI on a PUSCH. An eNB triggers an A-CSI report for at least one CSI process from a UE-k that includes information regarding a PMI type. This triggering by the eNB is transmitted to the UE-k via an UL grant. Upon receiving and successfully decoding the UL grant in a subframe n, the UE-k reports a requested A-CSI after n+$n_{ref}$ subframes that contain the PMI type requested by the eNB. While this scheme is geared toward the A-CSI, it is also possible to link this reporting with the most recently requested PMI type (such as conveyed in the UL grant) on P-CSI reporting as well. Therefore, the P-CSI and A-CSI are linked within a CSI process as illustrated in FIG. 8. With this scheme, the eNB dynamically switches the PMI type associated with the P-CSI via the CSI triggering associated with the A-CSI. In terms of timing relationship, the UE-k and consequently the eNB assumes that a PMI type decoded between a subframe n and a subframe n+$n_{ref}$ (such as the UE-k receives the UL grant in the subframe 810) is applied to the associated P-CSI starting from the subframe n+$n_{ref}$ until another A-CSI trigger is received and successfully decoded. In one example, to allow some timing margin for a UE implementation, a UE-k and consequently an eNB assumes that a PMI type decoded between a subframe n and a subframe n+$n_{ref}$ (such as the UE-k receives the UL grant in subframe n 810) is applied to the associated P-CSI starting one subframe after n+$n_{ref}$ until another A-CSI trigger is received and successfully decoded along with the one-subframe offset.

In the aforementioned embodiments, it is possible that a UE-k fails to detect and decode an UL grant. Therefore, it is necessary for an eNB to employ a discontinuous transmission (DTX) detection to check if the UE-k performs the expected UL transmission within a subframe of interest. In an A-CSI and a P-CSI, the associated CSI feedback payload size is adapted based on the PMI type and/or a codebook subset restriction (CSR) conveyed by the UL grant. This facilitates overhead reduction. As illustrated in FIG. 8, a linking of an A-CSI and a P-CSI is imposed by a PMI type conveyed in the A-CSI upon the P-CSI. In addition, $n_{ref}$=4 is defined as a typical FDD operation.

In some embodiments, a semi-static switching (such as on and off) of PMI reporting for $W_L$ is performed. This embodiment facilitates a switching between solutions for the aforementioned embodiments (such as the scenario A and the scenario B). A higher-layer or RRC signaling mechanism (such as a content of ASN.1 fields) is used by an eNB to configure a UE-k to switch the PMI reporting for $W_L$ on and off. Accordingly, the UE-k is configured with one of three predefined PMI types, for example, 1) $W_L$ (such as a long-term) only, 2) V (such as a short-term) only, and 3) both $W_L$ and V through a higher-layer parameter (such as RRC signaling). This configuration is defined separately from the configuration(s) used for a CSI reporting mode. Therefore, this configuration is applicable to any CSI reporting mode that supports PMI. Accordingly, for a given CSI process, the PMI type reporting is changed semi-statically.

In some embodiments, an eNB simply associates one CSI process with a fixed predetermined PMI type rather than allowing switching (such as either a dynamic or a semi-static) of a PMI type within one CSI process. This is the simplest solution that avoids the need for changing PMI type. Therefore, depending on the type(s) of PMI reporting that a UE-k is configured (such as one, two, or three of the three possible types), the UE-k is assigned an appropriate number of CSI processes. Accordingly, a total number of CSI processes for the UE-k is proportional with a number of PMI types that the UE-k needs to support in association with the eNB. In one example, if an eNB configures a UE-k with two out of three PMI types, for example, V (a short-term) only and both $W_L$ and V, the eNB configures the UE-k with two CSI processes associated with those two types.

Figure 9:
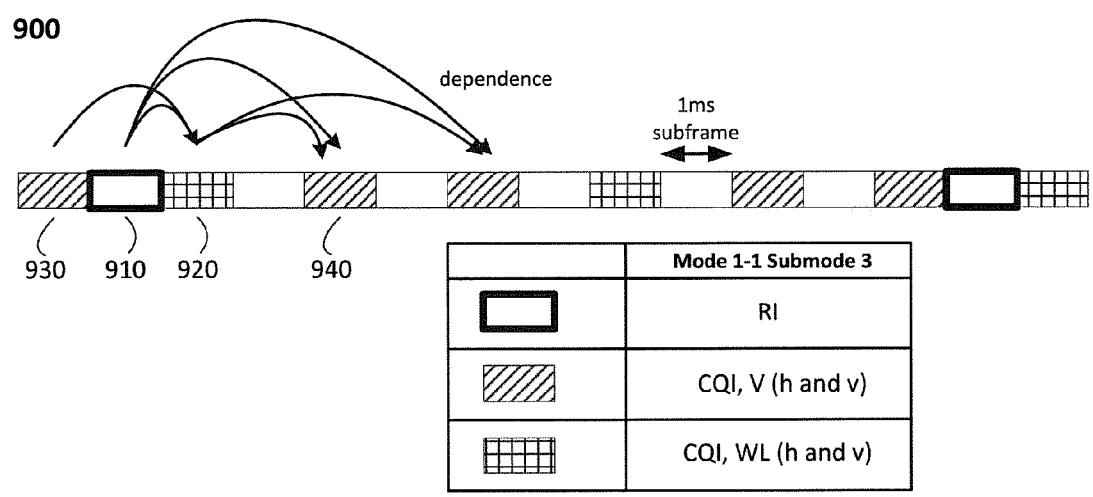
FIG. 9 illustrates another example of a CSI processing scheme to report a PMI component according to the present disclosure.

FIG. 9 illustrates another example of a CSI processing scheme 900 to report a PMI component according to this disclosure. The embodiment of the CSI processing scheme 900 shown in FIG. 9 is for illustration only. Other embodiments of the CSI processing scheme 900 could be used without departing from the scope of this disclosure. As illustrated in FIG. 9, the CSI processing scheme 900 comprises a plurality of subframes, 910, 920, 930, 940 each of which has 1 ms long that are sequentially transmitted in a transmission channel. When the subframe 910 is used for a mode 1-1 submode 3, the subframe 910 carries an RI. When the subframe 930 is used for the mode 1-1 submode 3, the subframe 930 carries a CQI, V (such as h and v). When the subframe 920 is used for the mode 1-1 submode 3, the subframe 920 carries a CQI, a WL (such as h and v).

In some embodiments, a switching between a PMI reporting for $W_L$ and V is performed across subframes and configured semi-statically. In one example, a higher-layer or RRC signaling mechanism (such as a content of abstract syntax notation.1 (ASN.1) fields) is used by an eNB to configure a UE-k to switch between the PMI reporting for $W_L$ and V by using a configured pattern in either a CSI process or a NZP CSI-RS resource configuration. This pattern is a sequence that depicts a reporting order (such as {1,2,2} indicating that two reports of PMI associated with V (type 2) follows one report of PMI associated with $W_L$ (type 1)) or a part of CSI process configuration that indicates a reporting periodicity and a subframe offset of each of the two types of PMI reporting.

As illustrated in FIG. 9, a PUCCH mode 1-1 submode 3 where an RI is reported separately from CQI and PMI analogous to a PUCCH mode 1-1 submode 2 as illustrated in FIG. 6. However, a PMI reporting for $W_L$ and V (such as each reported together with CQI) is performed intermittently. In this situation, the PMI associated with V (such as {$i_{2,v}$, $i_{2,h}$}, {$i_{2,1}$, $i_{2,2}$} or {$i_2$}) is reported at twice the reporting rate of the PMI associated with $W_L$ (such as {$i_{1,v}$, $i_{1,h}$} or {$i_{1,1}$, $i_{1,2}$}). Therefore, some types of CSI reporting subframes are determined, for example, 1) an RI reporting subframes 910, a CQI+PMI ($W_L$) reporting subframes 920, and a CQI+PMI (V) reporting subframes 930. For the second subframe 920, CQI (such as including at least one CQI value) is calculated assuming the use of the precoding matrix (or matrices) corresponding to {$i_{1,v}$, $i_{1,h}$} or {$i_{1,1}$, $i_{1,2}$} reported in the subframe 920, and the use of the precoding matrix (or matrices) corresponding to the most recently reported {$i_{2,v}$, $i_{2,h}$}, {$i_{2,1}$, $i_{2,2}$}, or {$i_2$} (such as the subframe 930). The CQI and PMI values reported in the subframe 920 are conditionally calculated based on the most recently reported RI in the subframe 910. For the third subframe 930, CQI (such as including at least one CQI value) is calculated assuming the use of the precoding matrix (or matrices)

corresponding to the most recently reported $\{i_{1,v}, i_{1,h}\}$ or $\{i_{1,1}, i_{1,2}\}$ in the subframe 920, and the use of the precoding matrix (or matrices) corresponding to $\{i_{2,v}, i_{2,h}\}$, $\{i_{2,1}, i_{2,2}\}$, or $\{i_2\}$ reported in the subframe 940. The CQI and PMI values reported in the subframe 940 are conditionally calculated based on the most recently reported RI in the subframe 910.

Figure 10:
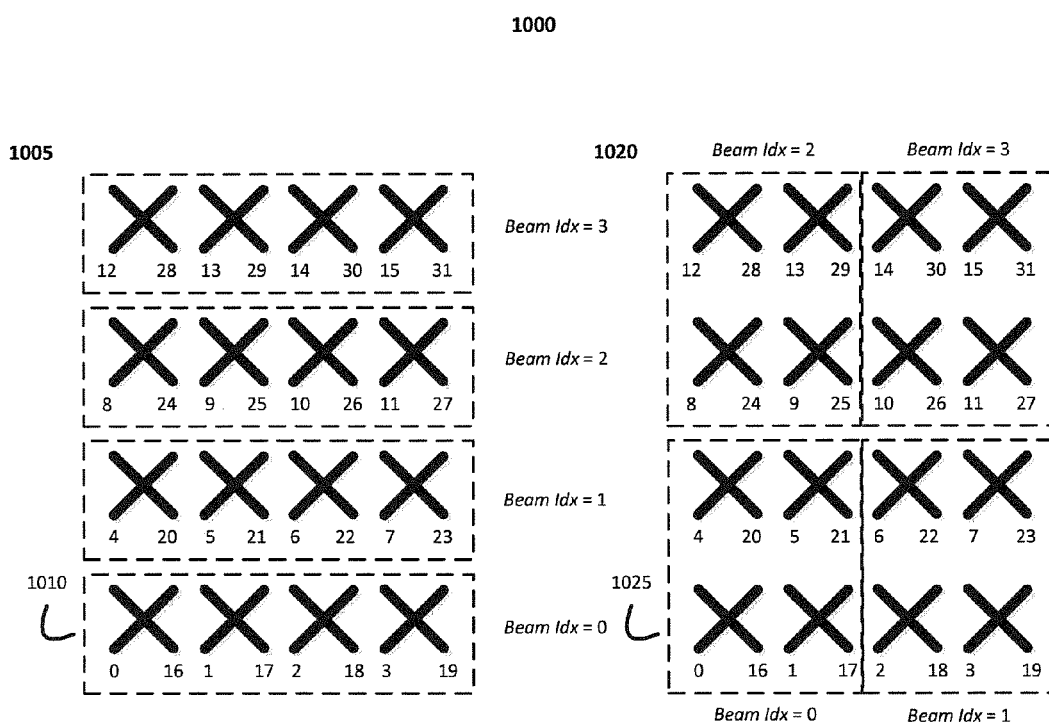
FIG. 10 illustrates an example of another 2D antenna array including an index of 4×4 dual polarized antenna array according to the present disclosure.

FIG. 10 illustrates an example of another 2 dimensional (2D) antenna array 1000 including an index of 4×4 dual polarized antenna array according to the present disclosure. The embodiment of the 2D antenna array 1000 shown in FIG. 10 is for illustration only. Other embodiments of the 2D antenna array 1000 could be used without departing from the scope of this disclosure. As illustrated in FIG. 10, an exemplary 2D antenna array 1000 that is constructed from 16 dual-polarized antenna elements arranged in a 4×4 rectangular format. In this illustration, each labelled antenna element is logically mapped onto a single antenna port. Two alternative labelling conventions are depicted for illustrative purposes (such as horizontal first 1005 and vertical first in 1020). In general, one antenna port corresponds to multiple antenna elements (such as physical antennas) combined via a virtualization. The 4×4 dual polarized array antenna is viewed as 16×2=32-element array of elements. A vertical dimension (such as consisting of 4 rows) facilitates elevation beamforming in addition to an azimuthal beamforming across a horizontal dimension (such as consisting of 4 columns of dual polarized antennas). While fixed beamforming (such as antenna virtualization) is implemented across the elevation dimension, it is unable to reap the potential gain offered by a spatial and frequency selective nature of the channel.

In some embodiment, multiple CSI processes for CSI reporting where one CSI process is associated with a beam (or a virtual sector) are utilized. In such embodiment, a beam is defined as a collection of NP CSI-RS antenna ports. For a 2D rectangular antenna array illustrated in FIG. 5, one row, comprised of four dual-polarized elements (such as eight elements), is associated with one vertical beam. If each antenna element or TXRU is mapped onto one NP CSI-RS antenna port, one beam is comprised of eight antenna ports as illustrated in FIG. 10 (such as 32 NP CSI-RS ports). Each of the four rows (such as 1010) is associated with one beam (such as indexed 0, 1, 2, and 3, respectively). Each beam is associated with one CSI process. In one embodiment, four CSI processes are used. In general, a beam is comprised of a 2D cluster of NP CSI-RS ports such as depicted in 1020 where a cluster 1025 is comprised of eight NP CSI-RS ports arranged in two rows and two columns. Similarly, each of these four clusters is associated with one beam and one CSI process. A serving eNB applies a beam-specific precoding or a beamforming across all the ports within each beam or virtual sector. This precoding or beamforming is transparent to any served UE.

In some embodiments, a UE measures each of beams or virtual sectors, and then calculates each of the beams or the virtual sectors. Next, the UE reports CSI for each beam (such as each CSI process). In such embodiments, the UE reports a beam selection index that informs an eNB of a recommended beam selection. As illustrated in FIG. 10, a 2-bit beam selection index is used. This process is reported in addition to four CSI reports corresponding to four CSI processes. Each of these four CSI reports is associated with one beam comprising 8 NP CSI-RS ports. Alternatively, instead of reporting all the four CSI reports, only one CSI report associated with the selected beam is reported.

In some embodiments, each of the beams or virtual sectors is associated with one CSI-RS resource while all the beams (such as all the CSI-RS resources) are associated with one CSI process. In such embodiments, a UE measures each of the beams or virtual sectors, and then calculates CSI associated with all the beams. The UE selects one out of those beams and reports a beam selection index that informs an eNB of a recommended beam selection. In addition, only one set of CSI parameters associated with the recommended beam or virtual sector is reported rather than $N_{beam}$ sets where $N_{beam}$ is a number of beams, $N_{beam}=4$ as illustrated in FIG. 10).

In the aforementioned embodiments, a beam selection index is defined in reference of a codebook for V as described in the equation (4) where a beam index value of $i_b(i_b \in \{0,1,\ldots N_{beam}-1\})$ indicates a recommended selection of the $i_b$-th beam that is associated with either the $i_b$-th CSI process or the $i_b$-th CSI-RS resource within a designated CSI process. This beam selection index is reported at a lower rate than the other CSI reporting parameters. This beam selection index utilizes any of PUCCH formats such as 1/1a/1b and 2/2a/2b.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE) comprising:
at least one receiver configured to receive a configuration message comprising a reporting type of channel state information (CSI);
a controller configured to calculate, in response to the configuration message, a CSI report comprising at least one precoding matrix indicator (PMI) associated with a codebook including a plurality of vectors, wherein at least one vector in the codebook represents a selection of a pair of antenna ports and a co-phasing between two antenna ports of the pair; and
at least one transmitter configured to transmit the CSI report on an uplink channel,
wherein the codebook associated with four antenna ports comprises at least the following vectors:

$$\left\{\frac{1}{\sqrt{2}}\begin{bmatrix}d_0\\d_0\end{bmatrix}, \frac{1}{\sqrt{2}}\begin{bmatrix}d_0\\-d_0\end{bmatrix}, \frac{1}{\sqrt{2}}\begin{bmatrix}d_0\\jd_0\end{bmatrix}, \frac{1}{\sqrt{2}}\begin{bmatrix}d_0\\-jd_0\end{bmatrix},\right.$$
$$\left.\frac{1}{\sqrt{2}}\begin{bmatrix}d_1\\d_1\end{bmatrix}, \frac{1}{\sqrt{2}}\begin{bmatrix}d_1\\-d_1\end{bmatrix}, \frac{1}{\sqrt{2}}\begin{bmatrix}d_1\\jd_1\end{bmatrix}, \frac{1}{\sqrt{2}}\begin{bmatrix}d_1\\-jd_1\end{bmatrix}\right\}$$

where $d_0 = \begin{bmatrix}1\\0\end{bmatrix}$ and $d_1 = \begin{bmatrix}0\\1\end{bmatrix}$.

2. The UE of claim 1, wherein:
the CSI report comprises at least one channel quality indicator (CQI) calculated for a plurality of configured subbands and one PMI calculated for the plurality of configured subbands; and
the at least one transmitter is further configured to periodically transmit the CSI report.

3. The UE of claim 1, wherein:
the CSI report comprises at least one CQI for a plurality of configured subbands, a plurality of subband CQIs for the plurality of configured subbands, and a plurality of subband PMIs associated with the codebook for the plurality of configured subbands; and the at least one transmitter is further configured to transmit the CSI report in response to a CSI request message received from an eNodeB.

4. The UE of claim 1, wherein:

the at least one receiver is further configured to receive a downlink control information (DCI) message that includes a PMI type request from an eNodeB;

the controller is further configured to calculate the PMI in accordance with the PMI type request; and the at least one transmitter is further configured to transmit the requested PMI type on the uplink channel.

5. The UE of claim 1, wherein the codebook associated with two antenna ports comprises at least the following vectors:

$$\left\{\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix}\right\}.$$

6. The UE of claim 1, wherein the codebook associated with eight antenna ports comprises at least the following vectors:

$$\left\{\begin{array}{l}\frac{1}{\sqrt{2}}\begin{bmatrix}d_0\\d_0\end{bmatrix}, \frac{1}{\sqrt{2}}\begin{bmatrix}d_0\\-d_0\end{bmatrix}, \frac{1}{\sqrt{2}}\begin{bmatrix}d_0\\jd_0\end{bmatrix}, \frac{1}{\sqrt{2}}\begin{bmatrix}d_0\\-jd_0\end{bmatrix},\\ \frac{1}{\sqrt{2}}\begin{bmatrix}d_1\\d_1\end{bmatrix}, \frac{1}{\sqrt{2}}\begin{bmatrix}d_1\\-d_1\end{bmatrix}, \frac{1}{\sqrt{2}}\begin{bmatrix}d_1\\jd_1\end{bmatrix}, \frac{1}{\sqrt{2}}\begin{bmatrix}d_1\\-jd_1\end{bmatrix},\\ \frac{1}{\sqrt{2}}\begin{bmatrix}d_2\\d_2\end{bmatrix}, \frac{1}{\sqrt{2}}\begin{bmatrix}d_2\\-d_2\end{bmatrix}, \frac{1}{\sqrt{2}}\begin{bmatrix}d_2\\jd_2\end{bmatrix}, \frac{1}{\sqrt{2}}\begin{bmatrix}d_2\\-jd_2\end{bmatrix},\\ \frac{1}{\sqrt{2}}\begin{bmatrix}d_3\\d_3\end{bmatrix}, \frac{1}{\sqrt{2}}\begin{bmatrix}d_3\\-d_3\end{bmatrix}, \frac{1}{\sqrt{2}}\begin{bmatrix}d_3\\jd_3\end{bmatrix}, \frac{1}{\sqrt{2}}\begin{bmatrix}d_3\\-jd_3\end{bmatrix}\end{array}\right\}$$

where $$d_0 = \begin{bmatrix}1\\0\\0\\0\end{bmatrix},$$

$$d_1 = \begin{bmatrix}0\\1\\0\\0\end{bmatrix},$$

$$d_2 = \begin{bmatrix}0\\0\\1\\0\end{bmatrix},$$

and $$d_3 = \begin{bmatrix}0\\0\\0\\1\end{bmatrix}.$$

7. An eNodeB (eNB) comprising:

a controller configured to generate a configuration message comprising a reporting type of channel state information (CSI);

at least one transmitter configured to transmit the configuration message; and at least one receiver configured to receive a CSI report on an uplink channel, the CSI report including at least one precoding matrix indicator (PMI) associated with a codebook including a plurality of vectors, wherein at least one vector in the codebook represents a selection of a pair of antenna ports and a co-phasing between two antenna ports of the pair, wherein the codebook associated with four antenna ports comprises at least the following vectors:

$$\left\{\frac{1}{\sqrt{2}}\begin{bmatrix}d_0\\d_0\end{bmatrix}, \frac{1}{\sqrt{2}}\begin{bmatrix}d_0\\-d_0\end{bmatrix}, \frac{1}{\sqrt{2}}\begin{bmatrix}d_0\\jd_0\end{bmatrix}, \frac{1}{\sqrt{2}}\begin{bmatrix}d_0\\-jd_0\end{bmatrix},\right.$$

$$\left.\frac{1}{\sqrt{2}}\begin{bmatrix}d_1\\d_1\end{bmatrix}, \frac{1}{\sqrt{2}}\begin{bmatrix}d_1\\-d_1\end{bmatrix}, \frac{1}{\sqrt{2}}\begin{bmatrix}d_1\\jd_1\end{bmatrix}, \frac{1}{\sqrt{2}}\begin{bmatrix}d_1\\-jd_1\end{bmatrix}\right\}$$

where $d_0 = \begin{bmatrix}1\\0\end{bmatrix}$ and $d_1 = \begin{bmatrix}0\\1\end{bmatrix}$.

8. The eNB of claim 7, wherein:

the CSI report comprises at least one channel quality indicator (CQI) calculated for a plurality of configured subbands and one PMI calculated for the plurality of configured subbands; and the at least one receiver is further configured to periodically receive the CSI report.

9. The eNB of claim 7, wherein the CSI report comprises at least one CQI for a plurality of configured subbands, a plurality of subband CQIs for the plurality of configured subbands, and a plurality of subband PMIs associated with the codebook for the plurality of configured subbands, the CSI report being triggered by a CSI request message transmitted to a user equipment (UE).

10. The eNB of claim 7, wherein the codebook associated with two antenna ports comprises at least the following vectors:

$$\left\{\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}\frac{1}{\sqrt{2}}\begin{bmatrix}1\\-j\end{bmatrix}\right\}.$$

11. The eNB of claim 7, wherein the codebook associated with eight antenna ports comprises at least the following vectors:

$$\left\{\begin{array}{l}\frac{1}{\sqrt{2}}\begin{bmatrix}d_0\\d_0\end{bmatrix}, \frac{1}{\sqrt{2}}\begin{bmatrix}d_0\\-d_0\end{bmatrix}, \frac{1}{\sqrt{2}}\begin{bmatrix}d_0\\jd_0\end{bmatrix}, \frac{1}{\sqrt{2}}\begin{bmatrix}d_0\\-jd_0\end{bmatrix}, \frac{1}{\sqrt{2}}\begin{bmatrix}d_1\\d_1\end{bmatrix},\\ \frac{1}{\sqrt{2}}\begin{bmatrix}d_1\\-d_1\end{bmatrix}, \frac{1}{\sqrt{2}}\begin{bmatrix}d_1\\jd_1\end{bmatrix}, \frac{1}{\sqrt{2}}\begin{bmatrix}d_1\\-jd_1\end{bmatrix},\\ \frac{1}{\sqrt{2}}\begin{bmatrix}d_2\\d_2\end{bmatrix}, \frac{1}{\sqrt{2}}\begin{bmatrix}d_2\\-d_2\end{bmatrix}, \frac{1}{\sqrt{2}}\begin{bmatrix}d_2\\jd_2\end{bmatrix}, \frac{1}{\sqrt{2}}\begin{bmatrix}d_2\\-jd_2\end{bmatrix}, \frac{1}{\sqrt{2}}\begin{bmatrix}d_3\\d_3\end{bmatrix},\\ \frac{1}{\sqrt{2}}\begin{bmatrix}d_3\\-d_3\end{bmatrix}, \frac{1}{\sqrt{2}}\begin{bmatrix}d_3\\jd_3\end{bmatrix}, \frac{1}{\sqrt{2}}\begin{bmatrix}d_3\\-jd_3\end{bmatrix},\end{array}\right.$$

where $$d_0 = \begin{bmatrix} 1 \\ 0 \\ 0 \\ 0 \end{bmatrix},$$

$$d_1 = \begin{bmatrix} 0 \\ 1 \\ 0 \\ 0 \end{bmatrix},$$

$$d_2 = \begin{bmatrix} 0 \\ 0 \\ 1 \\ 0 \end{bmatrix},$$

and $$d_3 = \begin{bmatrix} 0 \\ 0 \\ 0 \\ 1 \end{bmatrix}.$$

12. A method of operating a user equipment (UE), the method comprising:
receiving a configuration message comprising a reporting type of channel state information (CSI);
calculating, in response to the configuration message, a CSI report comprising at least one precoding matrix indicator (PMI) associated with a codebook including a plurality of vectors, wherein at least one vector in the codebook represents a selection of a pair of antenna ports and a co-phasing between two antenna ports of the pair; and
transmitting the CSI report on an uplink channel,
wherein the codebook associated with four antenna ports comprises at least the following vectors:

$$\left\{ \frac{1}{\sqrt{2}} \begin{bmatrix} d_0 \\ d_0 \end{bmatrix}, \frac{1}{\sqrt{2}} \begin{bmatrix} d_0 \\ -d_0 \end{bmatrix}, \frac{1}{\sqrt{2}} \begin{bmatrix} d_0 \\ jd_0 \end{bmatrix}, \frac{1}{\sqrt{2}} \begin{bmatrix} d_0 \\ -jd_0 \end{bmatrix}, \right.$$
$$\left. \frac{1}{\sqrt{2}} \begin{bmatrix} d_1 \\ d_1 \end{bmatrix}, \frac{1}{\sqrt{2}} \begin{bmatrix} d_1 \\ -d_1 \end{bmatrix}, \frac{1}{\sqrt{2}} \begin{bmatrix} d_1 \\ jd_1 \end{bmatrix}, \frac{1}{\sqrt{2}} \begin{bmatrix} d_1 \\ -jd_1 \end{bmatrix} \right\}$$

where $d_0 = \begin{bmatrix} 1 \\ 0 \end{bmatrix}$ and $d_1 = \begin{bmatrix} 0 \\ 1 \end{bmatrix}$.

13. The method of claim 12, wherein:
the CSI report comprises at least one channel quality indicator (CQI) calculated for a plurality of configured subbands and one PMI calculated for the plurality of configured subbands; and
periodically transmitting the CSI report.

14. The method of claim 12, wherein:
the CSI report comprises at least one CQI for a plurality of configured subbands, a plurality of subband CQIs for the plurality of configured subbands, and a plurality of subband PMIs associated with the codebook for the plurality of configured subbands; and
transmitting the CSI report in response to a CSI request message received from an eNodeB.

15. The method of claim 12, wherein:
receiving a downlink control information (DCI) message comprising a PMI type request from an eNodeB;
generating the PMI in accordance with the request PMI type; and
transmitting the requested PMI type on the uplink channel.

16. The method of claim 12, wherein the codebook associated with two antenna ports comprises at least the following vectors:

$$\left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix}, \frac{1}{\sqrt{2}} \begin{bmatrix} 1 \\ j \end{bmatrix}, \frac{1}{\sqrt{2}} \begin{bmatrix} 1 \\ -j \end{bmatrix} \right\}.$$

17. The method of claim 12, wherein the codebook associated with eight antenna ports comprises at least the following vectors:

$$\left\{ \frac{1}{\sqrt{2}} \begin{bmatrix} d_0 \\ d_0 \end{bmatrix}, \frac{1}{\sqrt{2}} \begin{bmatrix} d_0 \\ -d_0 \end{bmatrix}, \frac{1}{\sqrt{2}} \begin{bmatrix} d_0 \\ jd_0 \end{bmatrix}, \frac{1}{\sqrt{2}} \begin{bmatrix} d_0 \\ -jd_0 \end{bmatrix}, \frac{1}{\sqrt{2}} \begin{bmatrix} d_1 \\ d_1 \end{bmatrix}, \right.$$
$$\frac{1}{\sqrt{2}} \begin{bmatrix} d_1 \\ -d_1 \end{bmatrix}, \frac{1}{\sqrt{2}} \begin{bmatrix} d_1 \\ jd_1 \end{bmatrix}, \frac{1}{\sqrt{2}} \begin{bmatrix} d_1 \\ -jd_1 \end{bmatrix},$$
$$\frac{1}{\sqrt{2}} \begin{bmatrix} d_2 \\ d_2 \end{bmatrix}, \frac{1}{\sqrt{2}} \begin{bmatrix} d_2 \\ -d_2 \end{bmatrix}, \frac{1}{\sqrt{2}} \begin{bmatrix} d_2 \\ jd_2 \end{bmatrix}, \frac{1}{\sqrt{2}} \begin{bmatrix} d_2 \\ -jd_2 \end{bmatrix}, \frac{1}{\sqrt{2}} \begin{bmatrix} d_3 \\ d_3 \end{bmatrix},$$
$$\left. \frac{1}{\sqrt{2}} \begin{bmatrix} d_3 \\ -d_3 \end{bmatrix}, \frac{1}{\sqrt{2}} \begin{bmatrix} d_3 \\ jd_3 \end{bmatrix}, \frac{1}{\sqrt{2}} \begin{bmatrix} d_3 \\ -jd_3 \end{bmatrix}, \right\}$$

where $$d_0 = \begin{bmatrix} 1 \\ 0 \\ 0 \\ 0 \end{bmatrix},$$

$$d_1 = \begin{bmatrix} 0 \\ 1 \\ 0 \\ 0 \end{bmatrix},$$

$$d_2 = \begin{bmatrix} 0 \\ 0 \\ 1 \\ 0 \end{bmatrix},$$

and $$d_3 = \begin{bmatrix} 0 \\ 0 \\ 0 \\ 1 \end{bmatrix}.$$

* * * * *